(12) United States Patent
Beloussov et al.

(10) Patent No.: US 7,461,144 B1
(45) Date of Patent: ***Dec. 2, 2008

(54) VIRTUAL PRIVATE SERVER WITH ENHANCED SECURITY

(75) Inventors: Serguei M. Beloussov, Singapore (SG); Stanislav S. Protassov, Singapore (SG); Alexander G. Tormasov, Moscow (RU)

(73) Assignee: SWsoft Holdings, Ltd. (BM)

( * ) Notice: Subject to any disclaimer, the term of this patent is extended or adjusted under 35 U.S.C. 154(b) by 966 days.

This patent is subject to a terminal disclaimer.

(21) Appl. No.: 10/837,757

(22) Filed: May 4, 2004

Related U.S. Application Data

(63) Continuation-in-part of application No. 10/703,594, filed on Nov. 10, 2003, which is a continuation-in-part of application No. 09/918,031, filed on Jul. 30, 2001, now Pat. No. 7,099,948.

(60) Provisional application No. 60/467,547, filed on May 5, 2003, provisional application No. 60/269,655, filed on Feb. 16, 2001.

(51) Int. Cl.
*G06F 15/173* (2006.01)
(52) U.S. Cl. .............. 709/223; 709/203; 707/202; 707/204; 719/238; 718/100; 718/108
(58) Field of Classification Search .......... 709/100, 709/108, 203, 223, 228; 707/202, 204; 719/238, 719/328; 718/100, 108
See application file for complete search history.

(56) References Cited

U.S. PATENT DOCUMENTS

| 5,905,990 | A | 5/1999 | Inglett | |
| 6,560,613 | B1 | 5/2003 | Gylfason et al. | |
| 6,618,736 | B1 | 9/2003 | Menage | |
| 7,219,354 | B1 * | 5/2007 | Huang et al. | 719/328 |

* cited by examiner

*Primary Examiner*—Patrice Winder
*Assistant Examiner*—Adnan M Mirza
(74) *Attorney, Agent, or Firm*—Bardmesser Law Group

(57) ABSTRACT

An end user computer includes a processor running an operating system. A plurality of virtual private servers (VPSs) are supported within the operating system. A plurality of applications are available to a user of the end user computer. The applications are launched within different VPSs. At least one of the VPSs has multiple applications launched within it. At least two of the applications are launched within different VPSs, and communicate with each other using secure communications means, such as firewalls, proxies, dedicated clipboards, named pipes, shared memory, dedicated inter-process communications, Local Procedure Calls/Remote Procedure Calls, API, network sockets, TCP/IP communications, network protocol communications and memory mapped files. The VPSs can be dynamically created and terminated. VPS control means are available to the user and include means for creation/termination of VPSs, a file system and registry backup, control information for backup/restore of data on a VPS level, placement of applications/processes rules for creation/support of corresponding VPSs, granulation of isolation for VPS/applications/processes, computer resource control, definition of permissible operations for inter-VPS communication, means for definition of permissible operations for inter-process communications.

29 Claims, 13 Drawing Sheets

Normal Mode

VIRTUAL PRIVATE SERVER WITH ENHANCED SECURITY

CROSS-REFERENCE TO RELATED APPLICATIONS

This application is a continuation-in-part of U.S. patent application Ser. No. 10/703,594, filed on Nov. 10, 2003, which is a continuation-in-part of U.S. patent application Ser. No. 09/918,031, filed on Jul. 30, 2001, which claims priority to U.S. Provisional Patent Application No. 60/269,655, filed on Feb. 16, 2001, and to U.S. Provisional Patent Application No. 60/467,547, filed on May 5, 2003, which are all incorporated by reference herein.

BACKGROUND OF THE INVENTION

1. Field of the Invention

The present invention is related to virtual private servers, and more particularly, to virtual private servers for use in a desktop or laptop environment.

2. Related Art

With the popularity and success of the Internet, server technologies are of great commercial importance today. An individual server application typically executes on a single physical host computer, servicing client requests. However, providing a unique physical host for each server application is expensive and inefficient.

For example, commercial hosting services are often provided by an Internet Service Provider (ISP), which generally provides a separate physical host computer for each customer on which to execute a server application. However, a customer purchasing hosting services may often neither require nor be amenable to paying for use of an entire host computer. In general, an individual customer will only require a fraction of the processing power, storage, and other resources of a host computer.

Accordingly, hosting multiple server applications on a single physical computer is desirable. In order to be commercially viable, however, every server application needs to be isolated from every other server application running on the same physical host. Clearly, it would be unacceptable to most customers of an ISP to purchase hosting services, only to have another server application program (perhaps belonging to a competitor) access the customer's data and client requests. Thus, each server application program needs to be isolated, receiving requests only from its own clients, transmitting data only to its own clients, and being prevented from accessing data associated with other server applications.

Furthermore, it is desirable to allocate varying specific levels of system resources to different server applications, depending upon the needs of, and amounts paid by, the various customers of the ISP. In effect, each server application needs to be a "virtual private server" or VPS, simulating a server application executing on a dedicated physical host computer.

Such functionality is unavailable on traditional server technology because, rather than comprising a single, discrete process, a virtual private server must include a plurality of seemingly unrelated processes. Each process performs various elements of the sum total of the functionality required by the customer. Because each virtual private server includes a plurality of processes, traditional server technology has been unable to effectively isolate the processes associated with one virtual private server from those processes associated with other virtual private servers.

Thus, a major problem with conventional VPS implementations is the lack of isolation between the VPSs. This means that a conventional VPS has to operate in a "friendly environment," relying on other VPSs and other applications running in those other VPSs to not invade its address space, or to utilize more than their share of resources. This is also sometimes known as a cooperative environment (vs. a non-cooperative environment, where users or applications of one VPS cannot be trusted to not modify data that does not belong to them or to not attempt to "hog" all system resources). However, there is a difficulty of utilizing "cooperative" VPSs in any number of applications. For example, in the web server context, it is assumed that the host will be subject to attack by hackers. No assumption of a friendly environment can be made in that case. Also, in the absence of isolation between the VPSs, one VPS can "hog" more than its share of system resources, or can affect and/or modify objects and data that belong to other VPSs.

In addition to security being an issue in a server environment, security is also an increasingly important issue for home desktop computing, laptops, and small business environments. For example, with the increasing vulnerability of home computers to viruses that spread through email attachments and executable downloadable files, data on the individual computer can be corrupted. Executable files received via email or data files of known applications (like Microsoft Word files, Excel spreadsheets, bitmaps, etc.) can contain viruses or cause system failure because of bugs in security of mail clients or operating system. Also, such computers are frequently used for what is known as denial of service (DOS) attacks, where a virus infects a computer, but does not perform any hostile acts towards the computer itself. However, at a pre-set time, if the computer is connected to the Internet, the computer sends numerous requests for service to a particular IP address on the Internet. With hundreds and thousands of such computers unwittingly acting as "hosts" for the virus, the server at the target IP address is overwhelmed by fake requests for service, and is either unable to service "real" requests for service, or crashes due to overload.

Some conventional systems employ a relatively primitive scheme that uses "zones" with separate trust levels. For example, the Microsoft Internet Explorer (and .net) approach is URL-based, where the user defines certain links on the Internet has having various levels of trust.

In the case of the Internet Explorer approach, for example, if a particular site is on the company intranet, then it may be permitted the full range of options. If the site is an external site whose trustworthiness is unknown, it may be assigned the lowest trust setting. There are also options for various in-between states, for example, restrictions on downloading from a site, or certain restrictions on javascripts. Similarly, there may be restrictions on downloading of applets, or downloading of applets that access local files on the hard drive. However, such a browser-settings based approach has proven to be inadequate, particularly for computers used in the home and in small businesses.

Accordingly, there is a need in the art to enhance security of data and applications in the end user environment.

SUMMARY OF THE INVENTION

Accordingly, the present invention is related to a virtual private server for end user computing with enhanced security that substantially obviates one or more of the disadvantages of the related art.

In one aspect, there is provided an end user computer including a processor running an operating system. A plurality of virtual private servers (VPSs) are supported within the operating system. A plurality of applications are available to a user of the end user computer. The applications are launched within different VPSs. The VPSs can also have multiple applications launched within them. The applications launched within different VPSs communicate with each other using secure communications means, such as firewalls, proxies, dedicated clipboards, named pipes, shared memory, dedicated inter-process communications, Local Procedure Calls/Remote Procedure Calls, API, and memory mapped files or the like. The VPSs can be dynamically created and terminated. VPS control tools are available to the user, such as means for creation/termination of VPSs, VPS file system and registry management, control information for backup/restore of data on a VPS level, placement of applications/processes rules for creation/support of corresponding VPSs, granulation of isolation for VPS/applications/processes, computer resource control, definition of permissible operations for inter-VPS communication, definition of permissible operations for inter-process communications, means for delegation of full or partial administration operations to a remote administrator, means for remote access of the end user computer, means for remote access of the VPSs, means for installation of applications into different VPSs and configuration of shared resources, and means for migration of the VPSs. One or more of the VPSs can be dedicated for administrative operations.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1A:
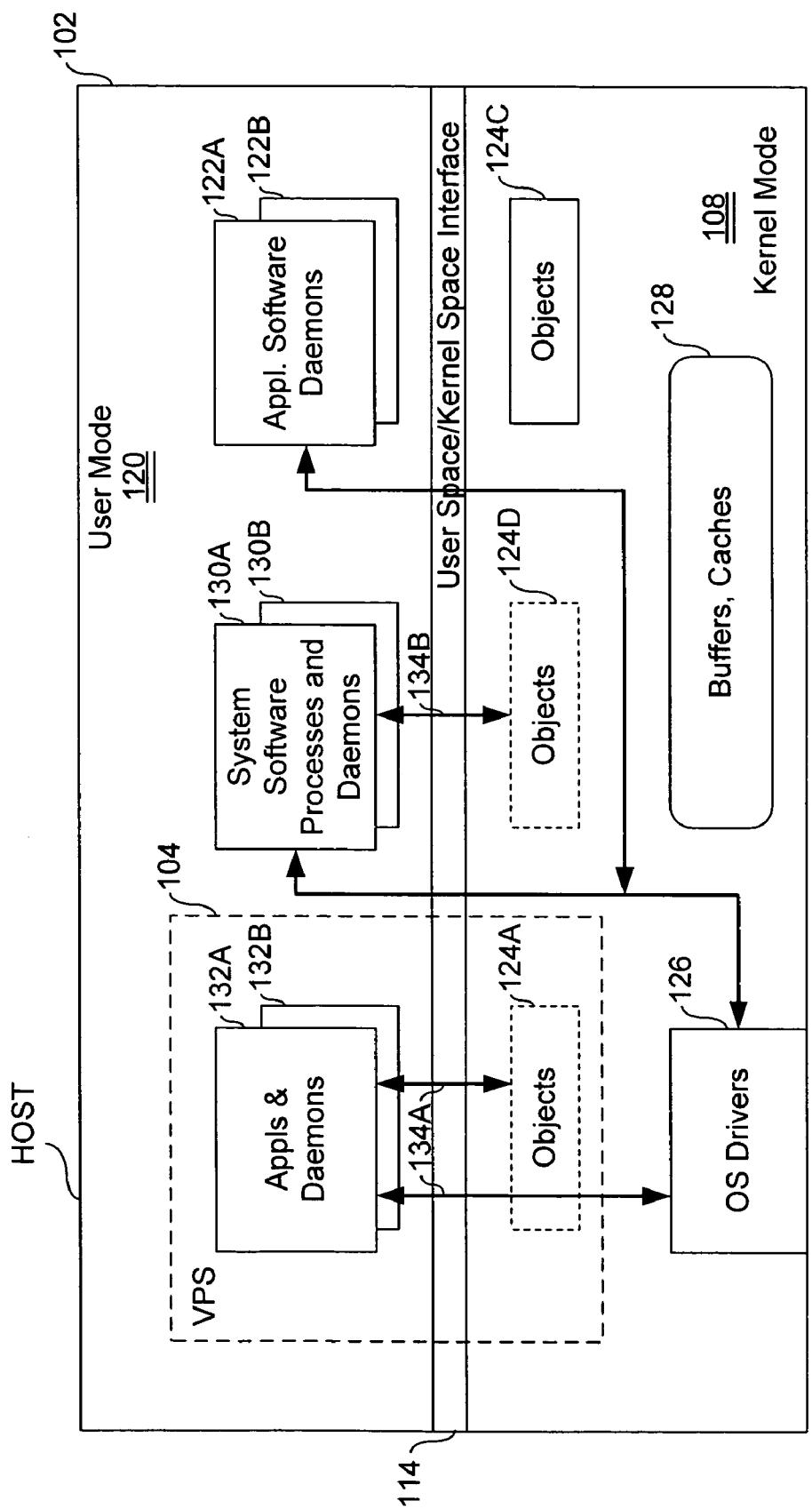
FIGS. 1A-1B show a system block diagram of one embodiment of the present invention.

Reference will now be made in detail to the preferred embodiments of the present invention, examples of which are illustrated in the accompanying drawings.

The present invention is directed to a system, method and computer program product for creating and managing virtual private servers, or VPSs in both a remote server and a desktop environment. A VPS is a closed set, or collection, of processes, system resources, users, groups of users, objects and data structures. Each VPS has an ID, or some other identifier, that distinguishes it from other VPSs. The VPS of the present invention offers to its users a service that is functionally substantially equivalent to a standalone server with remote access. From the perspective of an administrator, the VPS of the present invention appears substantially the same as a dedicated computer at a data center. For example, the administrator of the VPS of the invention has the same remote access to the server through the Internet, the same ability to reload the server, load system and application software (except modifications of the OS kernel and loading arbitrary kernel drivers or modules, and direct access to the hosts' physical hardware without support from the VPS implementation), launch VPS users, establish disk space quotas of the users and user groups, support storage area networks (SANs), set up and configure network connections and webservers, etc. In other words, substantially the full range of system administrator functions are available as if the VPS were a dedicated remote server, with the existence of the VPS being transparent from the perspective of both the VPS user and the VPS system administrator. From the user perspective, the VPS functionally acts essentially like a remote server, and offers the same services, for example, through a dedicated IP address. Note that some processes running in kernel mode can provide services to multiple VPSs. Note also that due to locality of particular resources and data related to a particular VPS, the present invention lends itself to supporting migration of a VPS to another physical host (e.g., another host in a cluster) by transfer of all data related to the VPS from one physical host to another. See U.S. Provisional Patent Application No. 60/467,547, filed on May 5, 2003, which is incorporated by reference herein.

This approach has a number of advantages compared to conventional approaches, particularly in the fields of web-hosting and server enterprise consolidation. The system administrator does not require any special training, since, from an administrator's perspective, the VPS functions essentially identically to a standalone server, and the administrator operations are the same. Furthermore, the launch of multiple VPSs in the same host permits a higher level of server utilization. With effective VPS resource isolation, it is possible to offer a guaranteed level of resource availability specified in a service level agreement (SLA).

It should be noted that, although there is no standard terminology, in a multi-process environment such as being described herein, processes (sometimes called "actors") generally are thought of as including one or more threads and related data (as well as non-thread related data), and threads can have sub-threads or fibers. It will be appreciated that this discussion is intended to be descriptive only, and the invention is not limited to the specific terminology, since different operating systems use different terms for threads (sometimes, for example, also called "lightweight processes").

One embodiment of the present invention includes a physical computer (usually called a "host") that is configured to run multiple isolated virtual private servers (VPSs). The host includes an operating system (OS) kernel. The kernel runs a number of processes and threads for execution of various system related processes. The host also includes a number of processes running on the server that correspond to the VPSs, with typically at least one user connected to at least one VPS.

The host can include: a physical memory, such as a dynamic random access memory (RAM) used by the various processes and threads. A virtual memory is allocated to each user or kernel process. A memory is allocated to the kernel of the operating system (either physical, pageable or non-pageable memory), and to various objects and data structures used by the operating system. The system may also include various storage elements, such as caches, and operating system buffers. The computer system also includes a central processing unit (CPU), or optionally multiple CPUs, whose time may be shared between and among the VPSs. A number of peripheral devices may be included, such as disk storage devices, input/output interfaces, network interfaces, etc. The storage mechanisms, particularly disk storage, may include a number of data files, databases, metadata storage and various other permanently and temporarily stored data objects.

Generally, as used in this description, the operating system (OS) kernel has one or more "processes" running inside kernel mode. The operating system itself may be viewed as a process. The OS process has its own objects for its own internal use, as well as a number of objects that are representative of the VPSs supported within it.

Each VPS is therefore a set of processes running within user mode and having support from the operating system kernel. Each such VPS typically has a number of OS users and groups, with objects representative of the users associated with the particular VPS. Also, each VPS typically has a number of processes and threads that correspond to, for example, application software run by a particular OS user. Each of these processes can also have multiple threads (sub-threads) running within them, sometimes called "fibers."

Each of the OS users typically has a unique identifier. For example, each user may have an identifier that is unique in the context of its own VPS, and which may be, but not necessarily, unique in the context of the host. Alternatively, each VPS may own user IDs, such that each user has a globally unique identifier within the host or domain of computers.

The VPS also includes a number of interfaces that permit the users to access the various services available on the server and on the kernel. Such interfaces include system calls, shared memory interfaces, I/O driver control (ioctls), and similar mechanisms. The operating system kernel includes a number of execution threads, lightweight processes, and/or other primitives for execution of the services to the users and for servicing user requests. Each VPS typically has its own "virtual address space" that may be partitioned among its users.

The OS kernel also typically uses a number of objects and data structures, each of which has an identifier that is unique within the context of the operating system kernel. Such identifiers are sometimes known as handles or descriptors (or sometimes they can simply be kernel memory addresses), depending on the particular OS implementation.

The operating system kernel also includes a number of processes, threads, lightweight processes, or other primitives running inside kernel address space in kernel mode. Typically, the kernel has its own virtual address space, and includes a number of objects and structures servicing the OS kernel processes. The kernel also may include a number of structures and objects that service the processes run by the users. The kernel may also include mechanisms for management and enumeration of operating system and VPS objects and structures, when such objects and structures are utilized by the OS kernel itself and by various processes run by the users and/or by the VPSs.

Each VPS typically includes a number of processes, threads, lightweight processes, and other primitives for servicing the users of that particular VPS. Each VPS also typically has its own objects and data structures that are associated with the processes and threads of that particular VPS. Each VPS may also include a number of objects and data structures utilized by the operating system for control of that VPS. Each VPS also may include its own set of OS users and groups, each of which has a unique ID in the context of that particular VPS but, as noted above, not necessarily unique in the context of the entire host or other VPSs. Each VPS also preferably includes its own file/disk space, which is allocated by the kernel for exclusive use by that VPS.

The VPS typically offers a number of services to the users. Examples of such services may be database access, webpage access, use of application software, remote procedure calls, etc. A number of these services are implemented as processes within that VPS. From the perspective of the user, the existence of the VPS is transparent, such that to the user it appears that he has an entire remote server dedicated to himself.

Figure 1B:
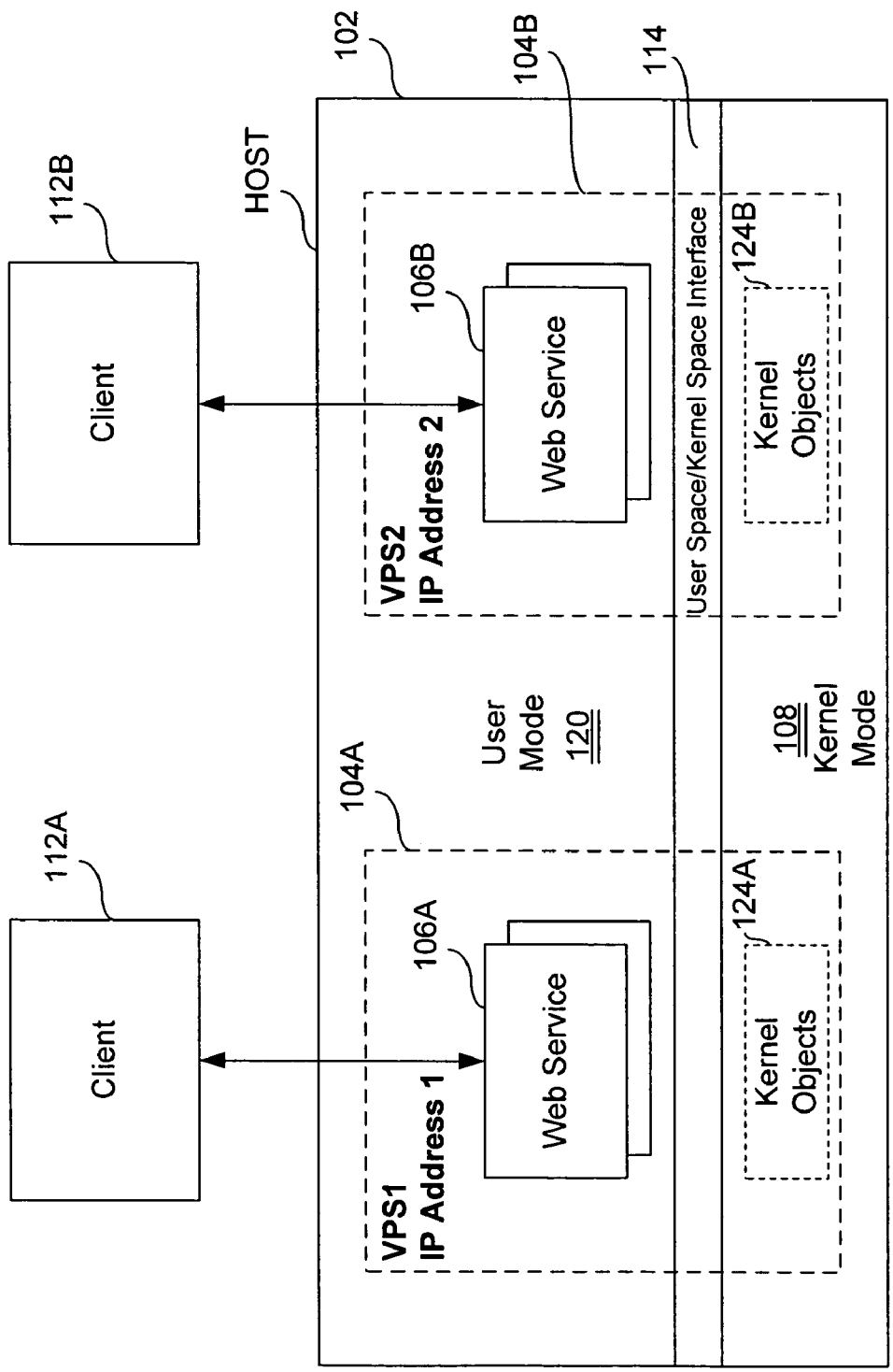

The system of the present invention will be further described with the aid of FIGS. 1A and 1B. Here, FIG. 1A is intended to illustrate the general case, and FIG. 1B, the application of the present invention to a webserver context. A host 102 is running an operating a system with a kernel 108. FIG. 1A shows a VPS 104A and FIG. 1B shows a VPS 104B. Each of these VPSs has its own IP address space. Within each VPS 104, a web server is running (here, designated by 106A, 106B, respectively). It will be appreciated that the web server example is used only for illustration purposes, and any remote server functionality may be implemented. Also, in FIGS. 1A and 1B, 114 designates an operating system interface (for example, typically including system calls, I/O controls (ioctls/fcntls), drivers, etc., which are used for communication between user space (user mode) 120 processes and kernel space (kernel mode) 108 processes). In this context, the OS kernel 108 is the protected part of the operating system, typically the part that is essential to the functioning of the host 102. Also, other, non-critical, applications may be loaded (e.g., the "Minesweeper" game in Microsoft Windows is a well known example of such a non-critical application that is typically a part of the loaded operating system, but is not a critical part).

FIG. 1A shows a set of applications and daemons 122A, 122B running in user mode 120. The server also includes a number of application programs, system services, daemons, and similar constructs typically utilized by the users (for example, Microsoft Word™, database software, webpage servers, remote procedure calls, support daemons, Telnet servers, etc.). 124A is a set of objects and data structures associated with a process that runs in the user mode 120, even though the objects and data structures 124A themselves exist in the kernel mode 108.

Referring to FIG. 1B, 124A, 124B designate a set of objects associated with a particular process. In FIG. 1A, 124D designates a set of objects and data structures associated with operating system software processes. 124C designates a set of objects and structures that are used by the OS kernel 108, for its own purposes. 126 designates operating system hardware drivers. 128 designates OS kernel buffers, caches, and other similar structures that are used for storage, and typically that have enumeration ability. 130A, 130B are system software processes and daemons. 132A, 132B are applications and daemons that exist in user space 120. Other examples of daemons include, for example, web server daemons that interact with Internet Explorer, RPC port mapper servers (i.e., servers that do not directly interface with users), etc.

134A, 134B designate communications between user space 120 processes and kernel space 108 processes. In the present invention, the isolation between the VPSs 104 is done at the kernel level. However, some of the VPS 104 functionality may be implemented in user space 120.

In FIG. 1B, the web servers 106A, 106B are connected to users (clients), in this case one client each, designated as 112A and 112B, respectively. Here, the client 112 is an example of a user. Another example of a user may be a VPS administrator. As noted above, the kernel 108 has a set of objects (here labeled as kernel objects 124A, 124B) that are representative of the VPS 104A, 104B, respectively. The client 112A can connect to the web server 106A using an IP address 1. The client 112B can connect to the web server 106B through an IP address 2. These are isolated, i.e., non-shared, addresses. The objects and structures associated with VPS 104A are distinct and isolated from the objects and structures associated with VPS 104B.

Additionally, each VPS 104A, 104B has its own set of resources, for example, its own disk space, file space, its own share of common network adapter bandwidths, etc. Any failure or error of web server 106A will not influence or interfere with the activities of VPS 104B. Thus, the client 112B can continue accessing its web server 106B even in the event of program failure or crash on the VPS 104A side. It will be appreciated that although the example of FIG. 1B is in only terms of two VPSs 104A, 104B, in actuality, any number of VPSs 104 (e.g., thousands) may be running on the host 102, limited only by physical system parameters, CPU speed, bandwidth and other resources limitations.

The amount of system resource use may be regulated by the operating system kernel 108, particularly by establishing limits on system resource use for each VPS 104. In particular, the operating system kernel 108 allows reserving a particular system resource for a particular VPS 104. Various algorithms may be used to insure that only actual users of a particular system resource are allocated that resource, thus avoiding allocating a share of system resources to those VPSs 104 that do not have users utilizing those resources at that particular time. Furthermore, the operating system kernel 108 dynamically allocates resources for the VPSs 104. Optionally, the resources allocated to a particular VPS 104 may exceed its originally (for example, Service Level Agreement-established) limits, when such resources are available to be utilized, assuming other VPSs 104 are not utilizing those resources. The resource allocation mechanism also allows compensation for over-use or under-use by a particular VPS 104 in a particular time period (time slice). Thus, if one VPS 104 under-utilizes its allocated system resources during one time slice, it may be allocated a greater share of system resources during the next time slice, and vice versa.

As noted above, each VPS 104 has a share of system resources allocated to it. The resources allocated to each VPS 104 (for example, memory, file space, I/O, etc.) are isolated from each other through the use of a VPS ID and other specific kinds of known addressing. In the absence of active user processes utilizing the relevant resources (in other words, when other VPSs 104 are under-utilizing their resources), another VPS 104 can take advantage of that by utilizing more than its originally allocated share of system resources if permitted by host configuration settings.

Figure 2:
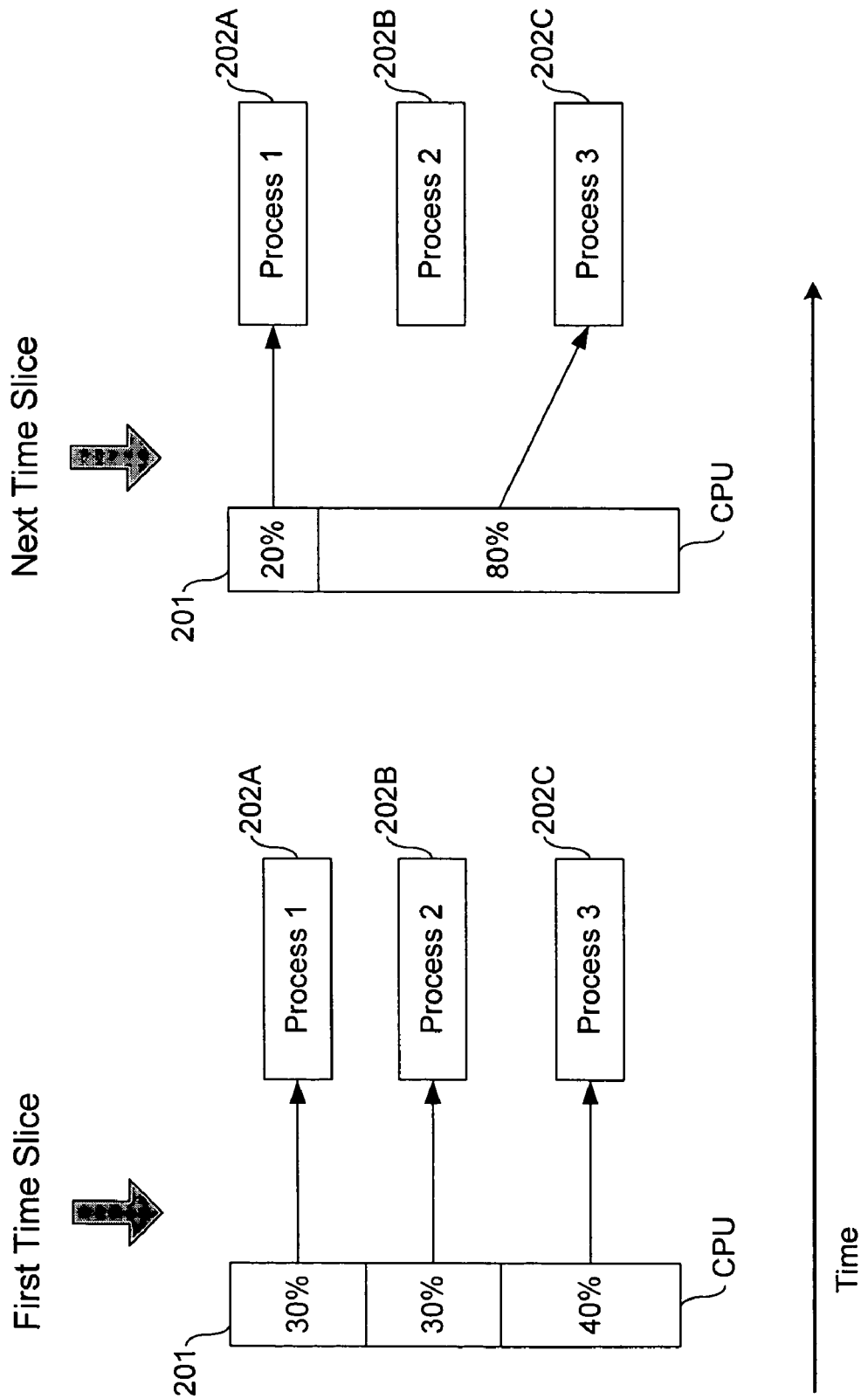
FIG. 2 illustrates an example of CPU resource management.

FIG. 2 illustrates an example of resource management, as discussed above. As shown in FIG. 2, a number of user processes, labeled 202A, 202B, 202C are running on a CPU 201, with the percentage of CPU resources allocated as shown—30%, 30%, and 40%, respectively, at time slice 1. As time progresses and the next time slice begins, process 202B is inactive, and process 1 requires only 20% of CPU utilization during that particular slice. Accordingly, process 202C is able to utilize the remaining 80% of the CPU resources. In this case, the 40% resource limit allocated to process 202C may be referred to as a soft limit. If the 40% figure is a "soft upper limit," the operating system kernel 108 may, for example, allocate the entire remaining 80% of the CPU resources to process 202C. On the other hand, if the 40% limit is a "hard limit," then the CPU usage by process 202C would remain at 40%. A similar approach may be taken with almost any system resource, for example, network bandwidth, disk space, memory usage, etc.

Figure 3B:
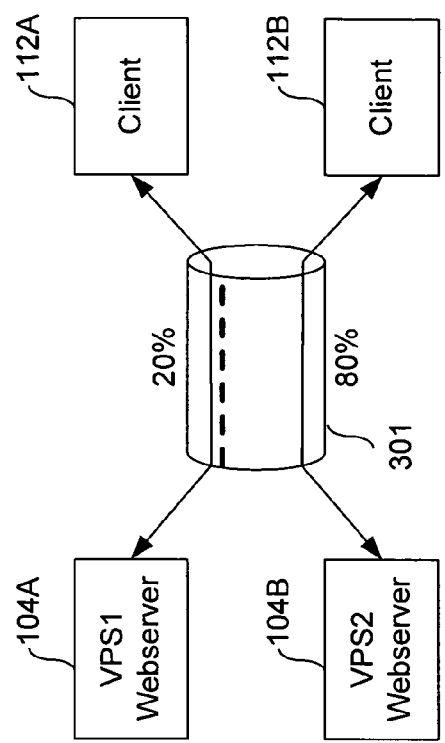
FIGS. 3A and 3B illustrate an example of dynamic partitioning of resources in a context of bandwidth allocation.
Figure 3A:
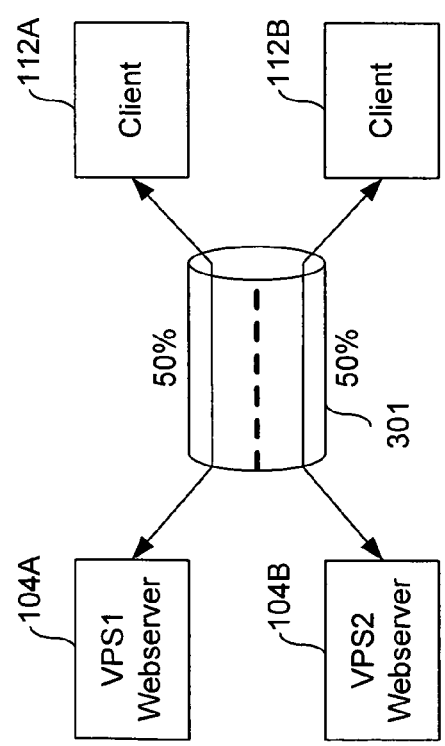

FIGS. 3A-3B illustrate an example of dynamic partitioning of resources in a context of bandwidth allocation. In FIGS. 3A-3B, 301 designates a communication channel, for example, an Internet link. As shown in FIG. 3A, initially, both webservers 106A, 106B are connected to their respective user processes (clients) 112A, 112B, sharing the communications link 301, with 50% of the bandwidth allocated to each. If the service level agreement for user process 112B includes a soft limit on bandwidth then, when user process 112A only requires 20% of the bandwidth of the channel 301, the entire remaining 80% of the bandwidth can be dynamically allocated to user process 112B. This scenario is illustrated in FIG. 3B.

Figure 4:
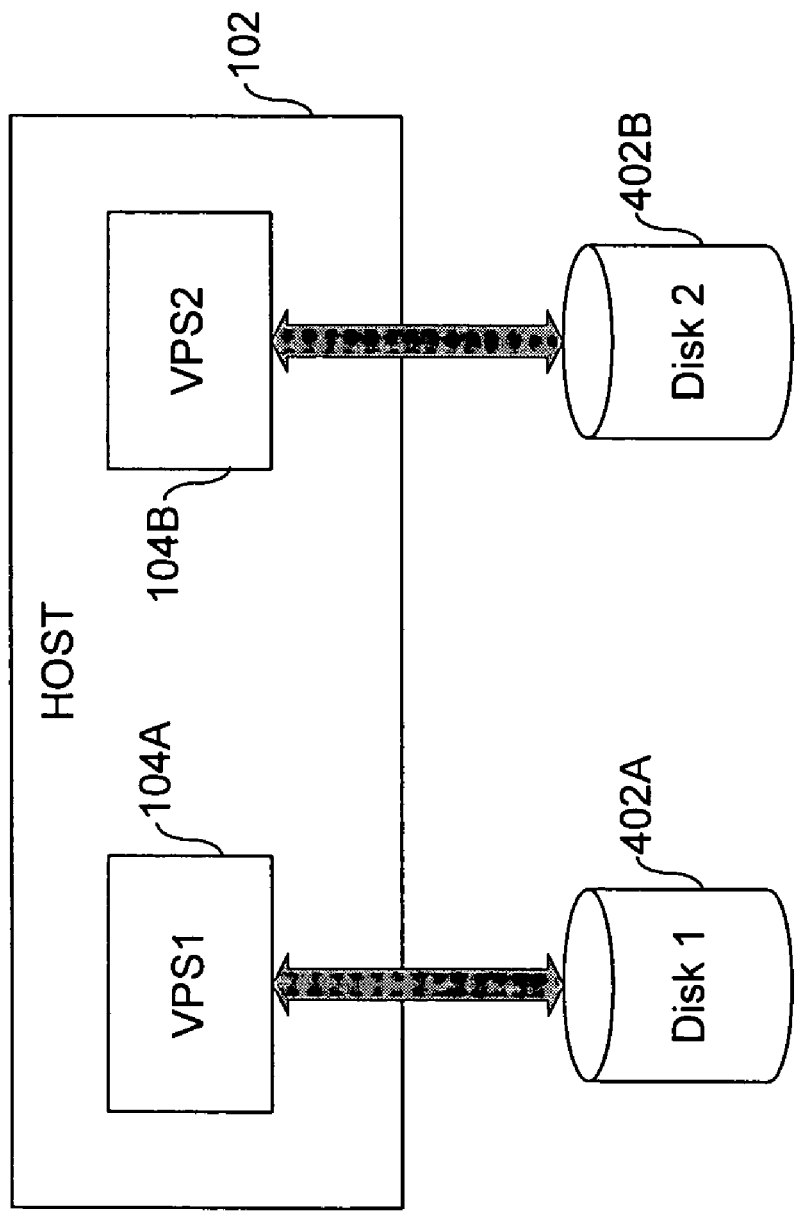
FIG. 4 illustrates an example of resource dedication.

FIG. 4 illustrates an example of resource dedication. As shown in FIG. 4, the host 102, running two VPSs 104A, 104B may be connected to two disk drives 402A, 402B. Each VPS 104 is allocated a dedicated disk drive. These may be either physical disk drives or virtual disk drives, such that each VPS 104A, 104B can only access its own disk drive 402A, 402B, respectively, and is unaware of the existence of any other VPS's disk drive.

To enable the resources allocation mechanism to each VPS 104, time slices (or time cycles) are defined such that resources are allocated on a time slice basis and (if necessary) reallocated during the next time slice. Different time slices can be defined for different resource classes. The system determines the amount of resources necessary for each VPS 104 to perform its function prior to the beginning of the next time slice. The system resources may be dynamically partitioned and dedicated, so as to ensure that the resources are allocated in accordance with the established service level agreement (SLA) for each VPS 104.

Figure 5:
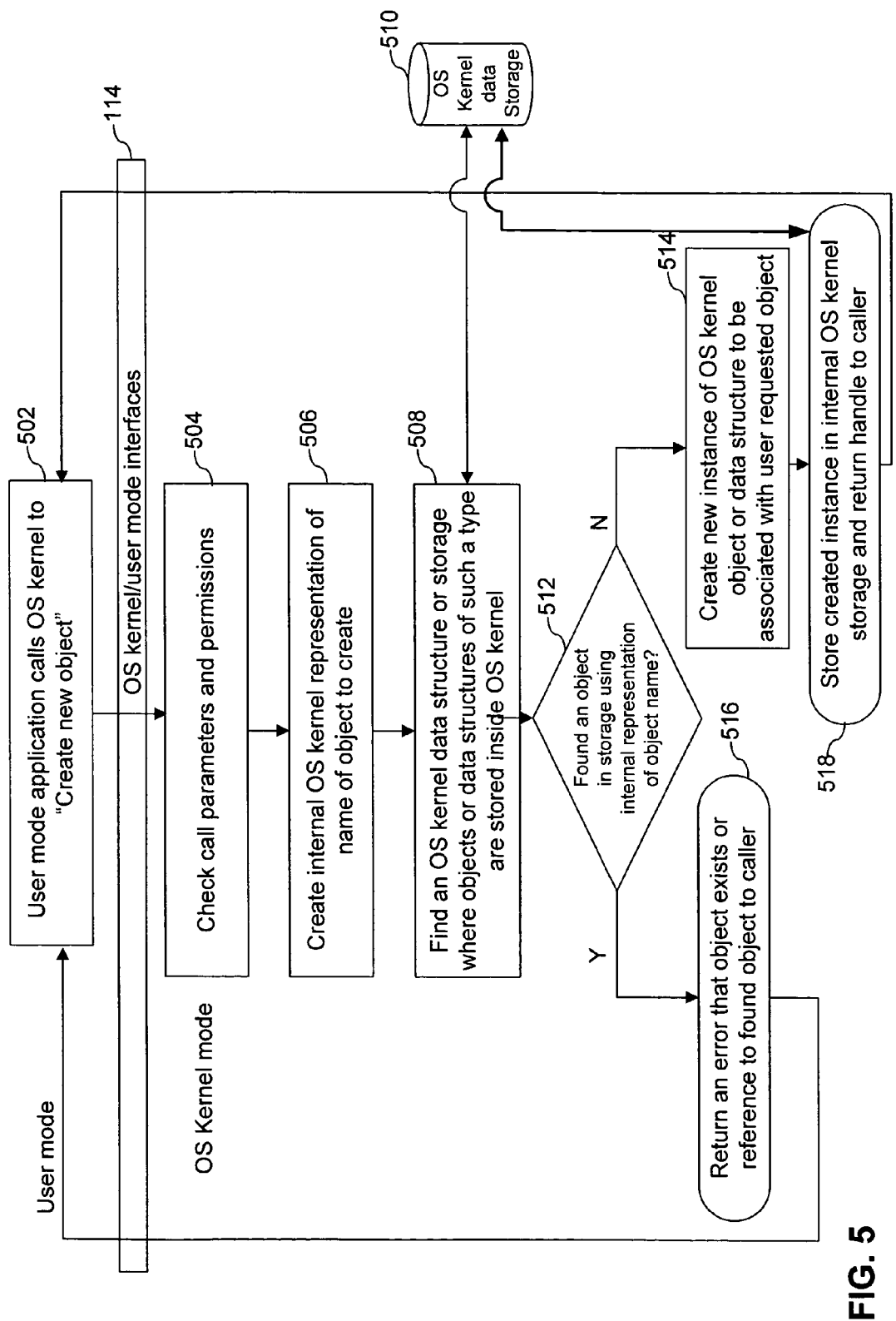
FIG. 5 illustrates one method of object creation in a VPS.

FIG. 5 illustrates one approach to the life-cycle of a VPS object using kernel mode interfaces 114. As shown in FIG. 5, a user mode application calls the OS kernel 108 to create a new object (step 502). The OS kernel 108 checks the call parameters and permissions associated with the calling process (step 504). An internal OS kernel representation of the object is created, including a name of the object about to be created (step 506). A kernel data structure is identified where objects or data structures of this type are stored for use by the OS kernel 108 (step 508). The process then checks whether it found an object in storage 510 using the kernel representation of the object name (step 512). The storage 510 may be used both by the kernel 108 and by the VPSs 110. If yes, then an error is returned to the calling process, indicating that such an object already exists (step 516), and the process then returns to step 502 (depending on the parameters of the call in step 502).

If the object is not found, a new instance of the OS kernel object is created, to be associated with the object requested by the calling process (step 514). The instance of the name of the object (or similar object ID) is stored in the storage 510, and a handle (i.e., an identifier) is returned to the caller (step 518). The process then returns to step 502 and the requesting (calling) process continues its execution.

Thus, in this approach, the operating system, upon creation of a user process, or upon response to an existing user process, can create internal objects and data structures that are meant for storage of service information associated with the requesting user process. For example, upon creation of an instance of a process, it is usually necessary to create a special table, which later is used for storage of open process handles and their associated system objects. For example, files and sockets, which this user process can utilize for its functioning, may need to be created. These objects may be unique for a particular process, or they may be associated with a number of different processes simultaneously (for example, the image of an executable file stored in a cache may be used by different processes). The objects themselves must be stored in the data structures of the operating system kernel, in order for the operating system to be able to remove them, add to them, search them, etc. This is the purpose of the storage 510 in FIG. 5.

The storage 510 may be, for example, dynamic random access memory, caches, buffers, files, etc. Other examples of storage 510 include a hash table to store IP addresses that are related to network interfaces, a linked list of processes initialized in the operating system kernel, a cache of pages associated with a disk (disk read and disk write cache), virtual memory descriptors for particular processes that correspond between virtual pages and physical pages in the memory, and swap file descriptors.

Step 506, as described above, means that the operating system kernel, when servicing a system call, must be able to work with a representation of an object name within the kernel. This representation (which may be referred to as a "name") may be, for example, similar in some sense to the original. For example, it can be a complete file name. It may also be, for example, an internal memory address that corresponds to a data structure that is responsible for a particular user object.

With further reference to step 516, the exact nature of what is returned to step 502 depends on the call options. Thus, for example, it may be that in response to an attempt to create a file with an existing name, a message will be returned that such a file cannot be created because it already exists, giving the user an option to overwrite it. As an alternative, the user may be prompted with a question of whether he wants to open the existing file.

Figure 6:
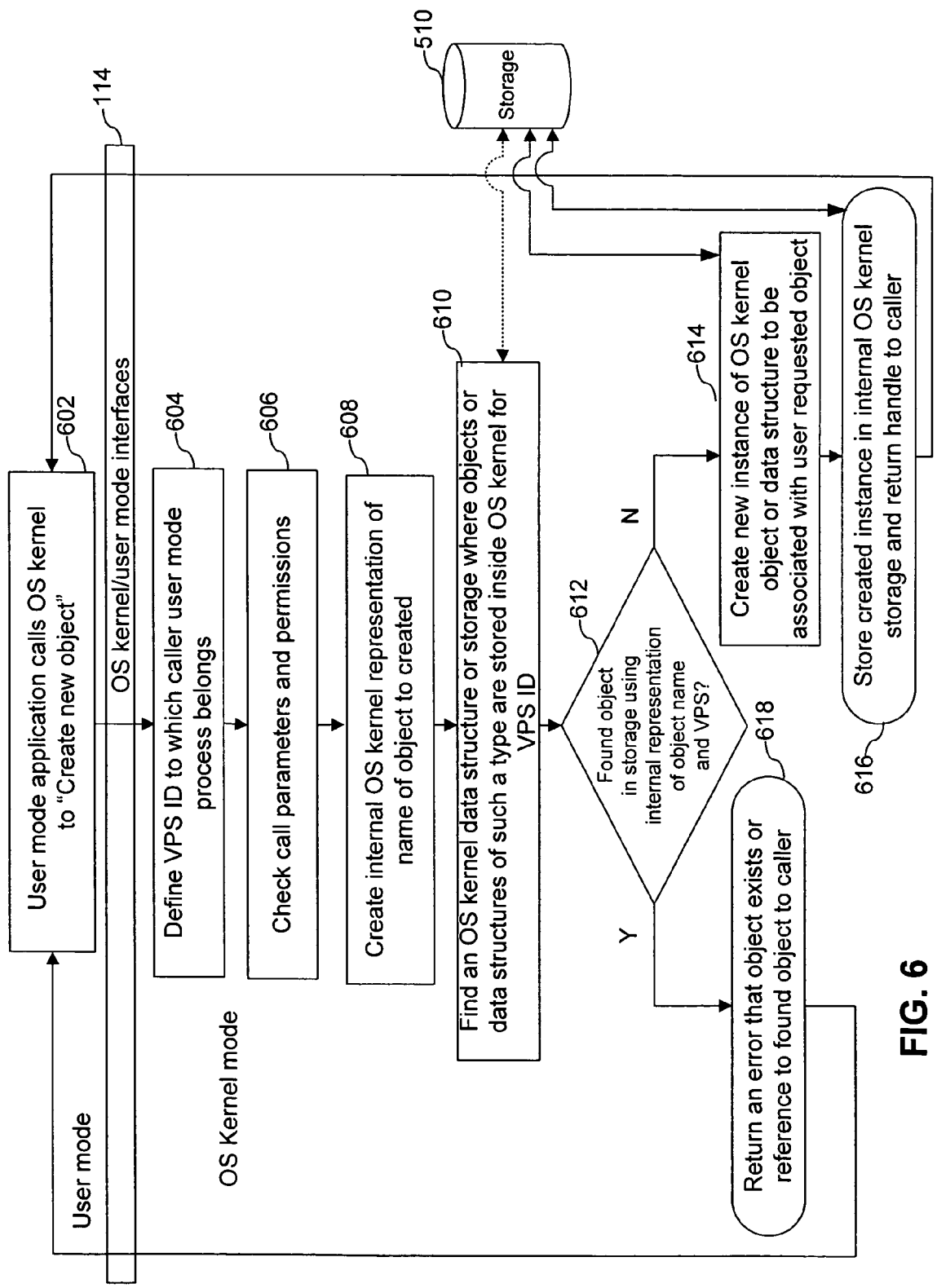
FIG. 6 illustrates another method of object creation.

FIG. 6 illustrates the creation of objects 124A according to a first embodiment of the present invention, which permits isolation between the various VPSs 104. As shown in FIG. 6 (and keeping FIG. 1B in mind), a service 106 running in the user mode 120 calls the kernel 108 to create a new object (step 602). In the OS kernel mode, the VPS ID to which this process belongs is identified (step 604). Call parameters and permissions of the caller are checked based on the VPS ID and, optionally, other conditions as well (step 606). An internal representation within the OS kernel 108 is created, including the name of the object (step 608). A storage 510 is searched for the OS kernel data structure, where objects or data structures of this type are stored for that particular VPS ID. If such an object is found (step 612) an error is returned that such an object already exists (step 618). If no such object is found a new instance of such an object 124A is created, such that it will be associated with the user request (step 614). An instance of the object name is stored in the storage 510, and a handle (or object id) is returned to the caller (step 616). The process then proceeds back to step 602 to continue execution.

The user 112 (e.g., a client or a VPS administrator) also has various mechanisms for controlling the VPS 104, for example, system administrator privileges that extend only to the administration of that particular VPS 104. The VPS 104 also has means for delivering to the user processes the results of the work performed in response to user requests, such as delivery of information, webpages, data from databases, word processing documents, system call results other files, etc. The VPSs 104 of the present invention permit isolation of each VPS 104 from other VPSs 104 running on the same physical host 102. This is achieved through a number of mechanisms, as described below.

Address isolation of user services allows specifying different addresses for the different services that are located in different copies of the VPSs 104. Each service or application launched with the VPS 104 should preferably be individually addressable. Users of that VPS 104 should be able to select an address and identify the server located within that particular VPS 104. A typical example of such an address is an IP address of the webserver (or DNS—domain name system—name), or network SMB name in Microsoft Network, used for access of MS Windows shared resources, or a telnet server address, used for interactive login. When choosing a particular address, the user must be certain that he will be accessing the server associated with that IP address and no other, and that someone trying an address that does not belong to that VPS 104 will not be accessing that VPS 104.

Another example of address isolation is isolation of credentials necessary for system login and authentication. In that case, even after entering a login of the VPS 104, the user will only be authenticated for that VPS 104, where he exists as a user. Anywhere else in the host 102, trying to access an incorrect IP address will result in service denial.

Isolation of all objects is implemented at the operating system kernel level, which insures that no process running on one VPS 104 can take advantage of objects running on any other VPS 104. This includes an inability by any user processes or any VPS 104 to renumber any object that does not belong to that particular VPS 104 or to effect a change of the state of any such object that does not belong to that particular VPS 104. This is necessary in order to prevent a malicious user from using application software to access another VPS 104. An example of such an attempt is a possibility of "killing a process" on another VPS 104. In this case, the user calls a special function in the kernel 108 (syscall), which can force the process kill, and whose function call parameter is the identifier of the process ("pid") to be killed. Without effective object isolation, a malicious user can kill processes on other VPSs 104. A similar concept applies to other objects and structures of the kernel 108, which are function call parameters of an API used within an application running inside a VPS 104. Also, file systems used by the VPS 104 need isolation to avoid being accessed by a malicious user on a different VPS 104. Thus, the invention prevents the use of system-offered APIs by one VPS's application to affect objects and structures associated with another VPS 104.

System resource isolation is necessary to ensure fulfillment of SLA conditions and guarantees. Each VPS 104, upon creation, has a set of resources allocated to it by the kernel 108. Examples of such resources are disk space, CPU time, memory use, etc., which may be used by processes within each VPS 104. The primary goal of such isolation is prevention of "hogging" of system resources by one VPS's process or processes.

Such hogging could prevent other VPSs 104 from delivering a satisfactory level of service to their users. This can occur accidentally, due to an error in a particular application, or deliberately, when one user attempts a Denial of Service attack. These resources may be external-oriented (e.g., network traffic and bandwidth), or host-specific, such as cache space dedicated by the kernel 108 to this process. A part of resource isolation is therefore ensuring a minimum level of service and minimum speed of execution of the user processes.

Additionally, failure isolation is also provided between processes running on one VPS 104 and processes running on other VPSs 104. This includes isolation from application crashes, webserver crashes and various other failure modes to which such processes are susceptible. Failure isolation implies that the same process cannot serve users of different VPSs 104. For example, with conventional shared webhosting, all users receive an ability to use different virtual webservers that are nevertheless hosted by the same actual ("real") webserver host. In this case, if a user of one webserver gains access to the host or gains exclusive access to its resources (e.g., through a CGI script), then all other users of all other virtual webservers will be unable to receive service. A badly written CGI script can easily use up significant CPU resources (for example, approaching 100% of the CPU resources), leaving almost nothing for other users. An example of a badly written CGI script is an infinite loop, as follows:

line 1
goto line 1

Failure isolation is in part obtained through resource isolation, although it also includes the functioning of the server as a whole, beyond just resource utilization by a particular process or user.

In the present approach, failure isolation is realized at the kernel level. In conventional approaches, failure isolation is usually done in the user space through application code checks and library changes. However, a malicious user can change the code of his own process in order to defeat such isolation, since he has access to his own code. This permits, for example, a Denial of Service attack.

Another conventional approach uses special user processes launched in user space. This has a severe overhead impact, since each OS call goes through a lengthy process of various additional calls in the different address spaces of different user mode processes.

Another way of effecting isolation is through hardware emulation in the user process, which can launch an operating system shell. An example of such an approach is an emulator from VMWare, Inc., 3145 Porter Drive, Palo Alto, Calif. 94304 (see, e.g., http://www.championsg.com/Champions_InnSite_v10.nsf/pages/Vmware). This approach ensures isolation, but results in additional overhead of having a "kernel above a kernel"—one real kernel, one emulated one. RAM use is highly inefficient in this case, since each kernel requires its own physical memory space. In contrast, the present invention provides the advantages of low overhead and high efficiency of RAM utilization, combined with scalable and effective isolation of the VPS processes from other VPSs.

It should be noted that the isolation of the VPSs 104 from each other as described above is accomplished through the use of objects and data structures of the operating system kernel 108. Support of multiple VPSs 104 can be implemented within a single OS kernel 108, further enhancing the isolation of the operating system to isolate the VPSs 104 from each other.

Figure 7:
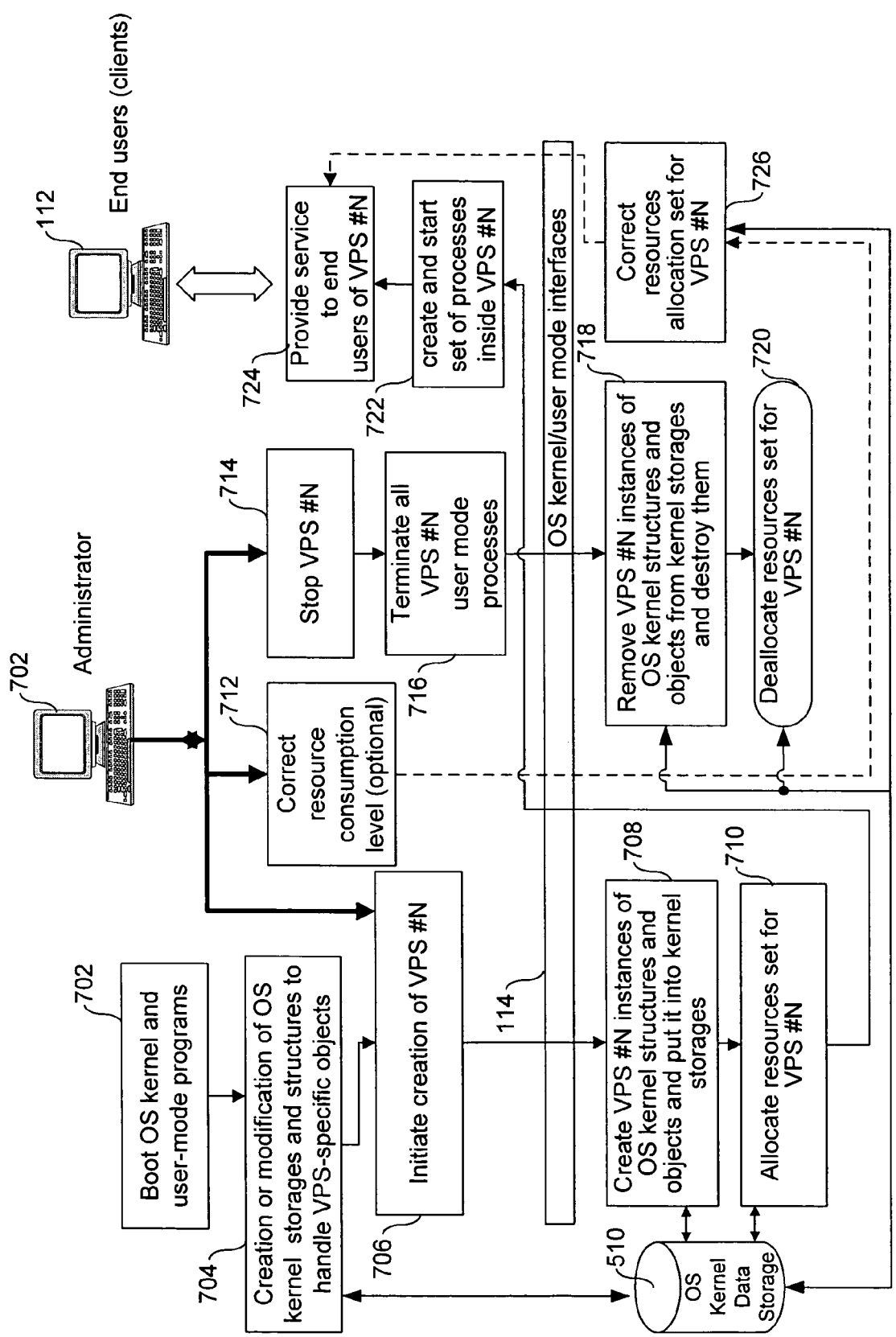
FIG. 7 illustrates a life cycle of a VPS according to the present invention.

FIG. 7 illustrates the process of a life cycle of a VPS 104 (see also discussion of FIG. 1B above). As shown in FIG. 7, the OS kernel 108 and various user mode programs are booted up (step 702). OS kernel storages and structures that handle VPS-specific objects (see 510 in FIG. 6) are either created and/or modified (step 704). A VPS #N with an ID number N is created (step 706). Instances of OS kernel objects and data structures corresponding to the VPS #N are created and placed in storage (step 708). A set of resources are allocated for the VPS #N (step 710). Processes are started and/or create inside the VPS #N (step 722). The VPS #N provides services to the end user 112 (step 724).

The host system administrator has the option of initiating creation of the VPS #N (step 706), correcting resource consumption level (step 712) and of the resource allocation level (step 726) or stopping a VPS #N (step 714). Upon stopping of the VPS #N, user mode processes for that VPS are terminated (step 716). All instances of OS kernel objects and structures corresponding to VPS #N are deleted or removed (step 718), and all resources allocated to VPS #N are de-allocated (step 720).

It should be noted that identification of the call context, which identifies which particular VPS 104 made the request to create an object, is an important aspect of object isolation. Without it, the operating system typically will be unable to determine whether a particular action is or is not allowed for a particular call. The operating system creates a data structure that stores the information corresponding to the VPS 104, which usually occurs when the VPS itself is created. Some of the information may be stored permanently. For example, in the file system there may be a configuration file for each VPS. The data structure also typically includes a number of parameters used for the functioning of the VPS 104 itself. Preferably, there is a short way of naming the VPSs 104, such that searching through the data structure can be accomplished rapidly. This may be a VPS ID, which can be, for example, a number, an alphanumeric string, or similar constructs. Those objects that are unambiguously identified as associated with a particular VPS 104 typically cannot be reassociated with another VPS, since such a possibility usually suggests a concurrent possibility of a security hole. In other words, if a process 132 is "born" in the context of one VPS 104, it cannot then live in another VPS.

The process of context identification of a particular call usually needs to define which VPS made the call, in other words, from which context this call originated. If the call to create an object 124A is generated from within user space 120, then to identify the VPS context, it is only necessary to identify the corresponding process ID, and through the process ID, it is possible to determine the VPS ID to which that process 132 belongs. If the call to create an object 124A is generated within the operating system kernel 108 itself and has no apparent user initiating that call (for example, receipt of a packet from a network adapter, which needs to be identified through its IP address), then the method of its identification depends on the context of the call and is typically defined by a special algorithm, which is dependent on a particular implementation.

Determination of a VPS ID that corresponds to the process is also implementation-specific, and may be done through adding to each process structure a VPS ID at the moment a process is created. This is similar to session ID in Microsoft Windows Terminal Server. Alternatively, there may be a list of how process IDs correspond to VPS IDs, where the process IDs are globally unique. In other words, each process has a globally unique ID in the context of the entire host. As yet another option, process IDs may be duplicated. In a sense, process IDs are unique only within the context of a particular VPS, but not necessarily globally unique within the entire host 102. Then, a different mechanism may be necessary for determining the call context (instead of relying on the process ID).

In the embodiment shown in FIG. 7, it is generally assumed that all processes that are "born" from a process 132 that has been previously launched within a particular VPS 104, belong to that VPS 104.

Normally, a VPS 104 is launched by launching a special process, with which a particular VPS ID is associated. After that process with the initial ID starts, other processes, which service that particular process, can be launched, such that they will themselves inherit the VPS ID of that particular parent process.

The present invention offers a significant advantage from the perspective of a system administrator of the host. Because of the various isolation capabilities, the effective utilization of the physical resources of the host may be significantly enhanced. This ultimately results in a lower total cost of ownership (TCO) in an enterprise or data center operation. Such a lower cost of ownership may be due to a reduced need to purchase additional hardware or hardware upgrades, less overhead associated with space rental, air conditioning, power, etc. There may also be lower network costs, and lower administrative overhead from installation or training. Administration of upgrades may also be less expensive because of similarity of user environments and other reasons, and customer satisfaction may be greater due to less apparent system failure and better ability by the data center to adhere to the service level agreement guarantees. Additionally, VPS owners can easily delegate some administration duties to data center administrator.

In one embodiment of the present invention, the VPSs 104 may be implemented as a software expansion of capabilities of Microsoft Windows-based servers (i.e., "add-ons"), for example, Microsoft Windows NT servers, Microsoft Windows 2000 servers, Microsoft Windows server 2003, and various derivatives thereof, by adding the missing isolation mechanisms and VPS resource management mechanisms to the operating system kernels of those operating systems.

In order to implement the VPS 104 of the present invention, the following steps typically need to be followed. First, the operating system needs to be installed initially on the computer. The software supporting the function of the VPSs 104 needs to be installed including, if necessary, various modules and programs residing within the operating system kernel. Additionally, various service modules and daemons, which function in user space 120, also may need to be installed. The operating system needs to be configured for support of the VPSs 104, for example, by installation of optional templates for subdividing the virtual address space and the file space between the various VPSs 104. The operating system may optionally need to be rebooted. Additional interfaces may need to be provided (such as system calls, ioctls, and other such resources) in order to enable client access to the various application software modules and other operating system functions that are normally accessible to the clients, and/or that enable the functionality of the VPSs 104.

The VPS functionality for each VPS 104 typically includes creation of a corresponding file structure and files to be used by the VPS 104. These may include, e.g., administrative files, user files, etc. Information relating to the particular VPS 104 is registered in a registration database and various other similar structures maintained by the operating system. This information is intended to enable continued functioning of the VPS 104. Additionally, each VPS 104 may be allocated its own IP address or group of IP addresses and other network resources.

The VPS 104 is then launched, after which the operating system starts running a number of processes or threads corresponding to the users 112 of that particular VPS 104. User process requests are then serviced by the host 102, with these requests being passed through the VPS 104 to the operating system kernel 108. Upon termination or shutdown of a particular VPS 104, all threads and processes associated with that VPS 104 are also terminated.

In general, in order to implement the present invention, the address space is divided into two areas: kernel space 108, which is used by the operating system in kernel mode, and is normally is not accessible by application software run by the users 112, and a set of virtual address spaces dedicated to user processes, generally referred to as "user space," 120, in which the VPSs 104 and the user applications 132 running in them exist. Each VPS 104 has its own set of addresses used by user processes to access different data locally and across a network. This is done in order to prevent security violations by a VPS 104. In the present invention, some of the VPS functionality may exist in the kernel space 108. Some of the functionality can also exist in the user space 120. In the user space 120, there may be software 130 supporting the needs of the operating system kernel. An example of such functionality may be a daemon that gathers statistics about resource usage the VPS 104. Another example may be a daemon that monitors VPS 104 processes, etc.

As noted above, each VPS 104 has a number of objects associated with it. Such objects are representative of the users 112, corresponding user processes and/or the applications being run within that VPS 104. Examples of such objects are file descriptors, security tokens, graphical objects (for example, used by graphical software to represent images), etc. Examples of objects 124D within the operating system kernel 108 are file descriptors, etc. Here, a data structure may be thought of as a special (simple) case of an object that does not include functional aspects associated with the object.

The VPS ID discussed above may be also thought of as similar to a mark or a handle, or a similar identifier or data structure that can be used for VPS 104 tracking. Thus, isolation is done through the tracking of VPS 104 and the objects associated with that VPS 104 by a VPS ID.

Although the description above is in terms of a single host 102 running multiple VPSs 104, the invention is equally applicable to a server cluster, where multiple hosts 102 are tied together. Also, the present invention is applicable to any type of server, for example, web server, LAN server, WAN, intranet server, etc.

Figure 8:
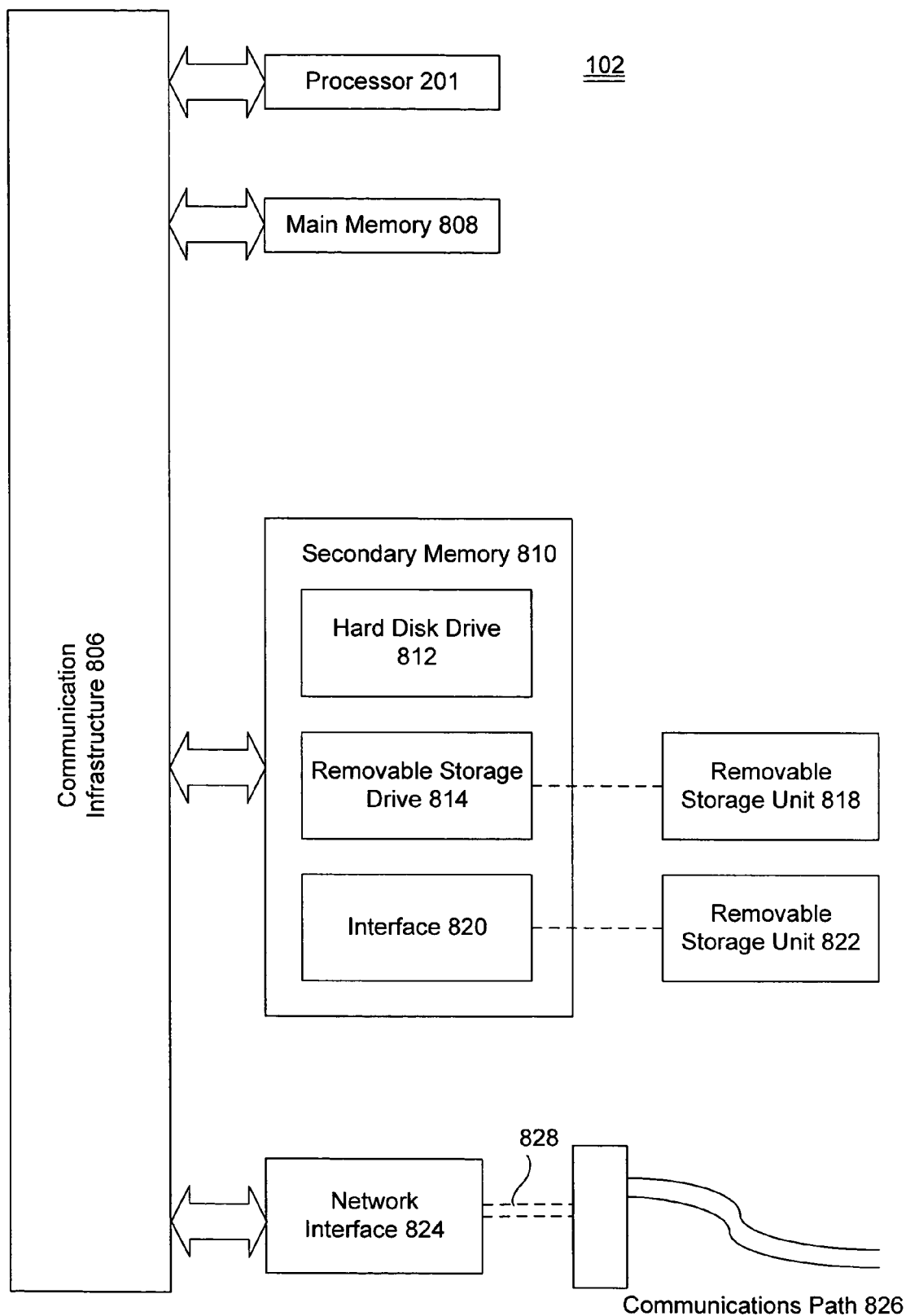
FIG. 8 illustrates an example of a host architecture that may be used in the present invention.

An example of the host 102 is illustrated in FIG. 8. The host 102 includes one or more processors, such as processor 201. The processor 201 is connected to a communication infrastructure 806, such as a bus or network). Various software implementations are described in terms of this exemplary computer system. After reading this description, it will become apparent to a person skilled in the relevant art how to implement the invention using other computer systems and/or computer architectures.

Host 102 also includes a main memory 808, preferably random access memory (RAM), and may also include a secondary memory 810. The secondary memory 810 may include, for example, a hard disk drive 812 and/or a removable storage drive 814, representing a magnetic tape drive, an optical disk drive, etc. The removable storage drive 814 reads from and/or writes to a removable storage unit 818 in a well known manner. Removable storage unit 818 represents a magnetic tape, optical disk, or other storage medium that is read by and written to by removable storage drive 814. As will be appreciated, the removable storage unit 818 can include a computer usable storage medium having stored therein computer software and/or data.

In alternative implementations, secondary memory 810 may include other means for allowing computer programs or other instructions to be loaded into computer system 800. Such means may include, for example, a removable storage unit 822 and an interface 820. An example of such means may include a removable memory chip (such as an EPROM, or PROM) and associated socket, or other removable storage units 822 and interfaces 820 which allow software and data to be transferred from the removable storage unit 822 to computer system 800.

Computer system 800 may also include one or more communications interfaces, such as communications interface 824. Communications interface 824 allows software and data to be transferred between computer system 800 and external devices. Examples of communications interface 824 may include a modem, a network interface (such as an Ethernet card), a communications port, a PCMCIA slot and card, etc. Software and data transferred via communications interface 824 are in the form of signals 828 which may be electronic, electromagnetic, optical or other signals capable of being received by communications interface 824. These signals 828 are provided to communications interface 824 via a communications path (i.e., channel) 826. This channel 826 carries signals 828 and may be implemented using wire or cable, fiber optics, an RF link and other communications channels. In an embodiment of the invention, signals 828 comprise data packets sent to processor 201. Information representing processed packets can also be sent in the form of signals 828 from processor 201 through communications path 826.

The terms "computer program medium" and "computer usable medium" are used to generally refer to media such as removable storage units 818 and 822, a hard disk installed in hard disk drive 812, and signals 828, which provide software to the host 102.

Computer programs are stored in main memory 808 and/or secondary memory 810. Computer programs may also be received via communications interface 824. Such computer programs, when executed, enable the host 102 to implement the present invention as discussed herein. In particular, the computer programs, when executed, enable the processor 201 to implement the present invention. Where the invention is implemented using software, the software may be stored in a computer program product and loaded into host 102 using removable storage drive 814, hard drive 812 or communications interface 824.

The approach described below takes advantage of the virtual private server concepts described above, and applies them to an end user environment. For purposes of definition, an "end user computer" refers to desktops, laptops, PDAs, smartphones, and other similar devices that are normally used by a single end user at any given time (as distinct from, for example, a webserver or a network server, which can have multiple users at any given time). Thus, in a conventional end user environment, there is a single "monolithic" operating system, a common file structure, a single clipboard, etc. However, virtual private server concepts can also be used to isolate various applications and data sets on the end user computer from each other, strictly regulating their interaction with each other and with various system resources. (Note that the invention can also be applied to servers intended to serve a set of user requests in the same manner to provide additional level of security for all users of the server and for the OS itself.)

The isolated VPS approach can be used to improve security level and overall stability of standard applications installed into an OS. Isolated VPSs can be implemented inside a single OS kernel space. Various control features, such as group scheduling of computer resources (e.g., the CPU, virtual and real memory, internal and shared memories, OS objects, disk quotas, network and IO bandwidth regulation, etc), can be implemented on the end user computer using the isolated VPS approach. VPS isolation also can include file system isolation (each VPS can have its own file system instantiation without wasting disk space), resources isolation, registry isolation, inter-process communications means isolation, and so on.

Even a relatively inexpensive computer with modest memory (by modern standards) can easily run a dozen VPSs. Thus, instead of a monolithic OS, a set of VPS can share a single piece of computer hardware. Each VPS can be isolated from each other. For inter-VPS communications, special stubs/proxies can be installed, which allow fully controllable (based on appropriate communications rules) means of communications, thereby giving to applications transparent communications abilities. These proxies/stubs allow the applications to interact in the same manner as they do in normal computer system (for example, users can use clipboard copy/cut/paste operations between different applications running in different VPSs entirely transparently).

To start application an, a user can use the same icons, menus, file system structure, and/or command lines, and these applications will be visually launched on the standard graphical end user computer on which the user typically works. The installation and start of any application will define an appropriate VPS, in which context this application should be installed and run, as well as appropriate communication proxies. A set of installation/behavior rules will allows automatic selection, creation and start/termination of appropriate VPS.

Different VPSs can also be separated based a "level of trust" for the particular application. This can be based on such criteria as source of application (e.g., downloaded applets via web browser from unknown sites, from trusted sites, with different requirements for OS resources and access to file system and registry, etc, time of activation, estimated load, possible network access level and so on). This approach provides a greater level of separation of applications and resources than, for example, the Microsoft in .net applications or the "security zones" in Internet Explorer, because it works on application level, not just inside a browser or .net applications context. However, the present approach includes the browser and net applications as well.

To the user, the use of VPSs to enhance security on the end user computer can be entirely transparent. In other words, the user need not be aware of how the enhanced security is implemented, and usually does not need to know the mechanisms that prevent corrupted applications, viruses, or other hostile entities from affecting the rest of the end user computer operation. Also, enhanced security can be implemented not at the browser level, but at an operating system level.

The concept of virtual private servers (VPSs) is therefore used to create secure "zones" in which the applications "live." For example, if desired, each application may exist as a process within its own VPS. In this case, there can be a single VPS for Microsoft Word™, a single VPS for Microsoft Outlook™ (or Outlook Express™), a single VPS for a web browser, etc. Alternatively, applications of a similar type may be launched within the same VPS. For example, Microsoft Word™ and Corel WordPerfect™ can be launched within the same VPS. Similarly, different email clients can be launched within the same VPS.

Although a mechanism may be provided for the end user computer to set parameters of the individual VPSs by the user, normally the user can also simply employ default parameters, and will have no need for customizing the settings, particularly those that relate to issues of security and file access.

Alternatively, it is possible that the same end user computer is used by a number of users, and each user gains access to the end user computer using a password. The VPS settings can be customized from user to user. For example, one user may have VPS settings that preclude Internet access completely without additional supervision or authorization (for example, in the case of children using a home computer), while another user (for example, an adult in the household) has full authorization to access the Internet. Alternatively, if an application such as Instant Messenger is launched by a child, the rights granted by the VPS to that application (in this case, when used by the child) may be more limited, and may require logging of all transactions. This might not be the case if a different user, such as an adult, were using the same Instant Messenger application.

The settings of the VPSs, in which the individual applications are launched, can be customized, or can be defined a priori. This is particularly useful in preventing the spread of viruses, and also in preventing such malicious behavior as denial of service attacks. In the well-known case of the NIMDA virus, the virus spreads through attachments to emails. To activate the virus, the user needs to open an email attachment using Microsoft Outlook™. At a later point in time, the attachment then starts sending requests for service to a pre-defined IP address on the Internet. With the present approach, an application such as Outlook™ would not be permitted by the VPS within which it is running to send requests for service to the Internet. Phrased another way, the VPS within which Microsoft Outlook™ is launched does not permit the use of this particular system resource to an application that is running within it. Therefore, even if an attachment infected by the NIMDA virus is downloaded and infects this particular end user computer, only one VPS (of the multiple VPSs that are potentially running on the end user computer) is affected, and this particular end user computer cannot be used in a denial of service attack.

Thus, in the case of a virus spread through an email client, such as Outlook™ or Outlook Express™, the isolated VPS approach ensures certain that the only files that are infected by a virus are those that are directly related to the email client, or those files that "live" in the particular VPS within which the email client is launched. Also, if the email client has been infected, it is relatively straightforward to terminate that VPS and the infected email client, and start another VPS with the email client, whose state corresponds to some backed-up state of the email client prior to the virus infection.

Additionally, the user interface does not need to change. From a user perspective, if he placed a number of icons on his end user computer for activating the various applications, the same exact user interface can appear to him even with the isolated VPS approach, as described herein.

The number of the VPSs need not stay constant over time. Some VPSs can be launched on demand (or dynamically "on the fly"), for instance, when Microsoft Word™ is launched, and terminated when the application is closed. Other VPSs can live "permanently," if desired. In other words, the VPSs can start when the end user computer is started up and initialized, or they can start on demand.

It will also be appreciated that just as in the case of VPSs used to run a server, firewalls may be employed between the VPSs in order to enhance security. In other words, inter-process communication can be more strictly regulated.

The present approach thus may be thought of as a fusion of "bottom-up" and "top-down" approaches: "top-down," using server-based VPS technology on an end user computer, where VPS concepts are used in a "slimmed-down" form but without compromising the security aspects of the VPS. A second way of looking at the problem ("bottom-up") is to visualize a conventional desktop as having a number of processes running within it, where these processes conventionally have relatively broad discretion for communicating with each other. A layer, or several layers, of security can be added to the inter-process communication issuing the VPS concepts, such that a single malfunctioning, or infected, process cannot affect, or infect, other processes.

In other words, for each process, or application, a set of permissible activities, and a set of resources to which that application has access, can be defined. In the context of denial of service attacks and virus infections, for example, this resource is network access, which can only be granted to those applications that expressly require it (for example, browser applications, Instant Messenger, Internet telephony, network- and Internet-based data backup systems, etc.). In this case, a virus that requires network access, such as NIMDA, will simply be unable to perform its task, since the VPS within which it is launched does not permit one of the required functions—in this case, Internet access.

It is possible for each VPS on the end user computer to have its own set of applications, servers, and daemons, which interact with their counterparts in the same VPSs in the same manner as on a remote server. On the other hand, inter-VPS communication, or inter-process communication on the end user computer occurs through less tightly coupled (and more supervised) mechanisms—for example, through firewalls, specialized jail/chroot environment, isolated file structures, etc. Thus, the inter-process communication can be supervised more closely than in the conventional "monolithic operating system" situation. This can also be done, for example, through required authorization for network communications, or through a requirement for an explicit permission for the particular mode of communication.

For example, in the case of opening a Word attachment from Outlook™, once the attachment is received and "clicked on," the attachment is actually transferred to another VPS, where the Word application is launched. Note that in neither of these cases does the VPS allow network access (provided it is set up that way), so that unwanted activities, such as denial of service attacks by a virus, would not occur.

The file itself can be stored in a temporary area, a clipboard, or some other "sandbox"-type mechanism or environment, where its activities cannot threaten anyone. From the perspective of the operating system, the file is opened "remotely," even though it physically occurs on the same end user computer.

Another example is opening files that include embedded objects from other applications. For instance, Microsoft Word™ documents can have Microsoft Excel™ tables embedded in them. Opening such a document also requires launching Microsoft Excel™. In this case, two applications are actually loaded into memory, the "primary" one, which is Word, and a "secondary" one, which is Excel. The two applications conventionally communicate with each other using COM objects. In the present approach, when the two applications (Word and Excel) are launched in separate VPSs, communication between them can be strictly controlled, for example, through firewall mechanisms. These firewall mechanisms, which can use network access methods, determine who is "connected," whether he has rights, what the rights are, whether the user has rights to launch Excel, etc. Unlike conventional systems, where such communication is rarely supervised, except possibly for a relatively high-level authorization, the present approach permits explicit checking of rights and permissions to launch applications for embedded objects.

Interaction between processes, applications, and services that run in different VPSs can be limited by the level of isolation of each VPS, and/or of the several VPSs that may be required to interact. As an alternative, dedicated secure methods of interaction and communication can be used—for example, secure proxies, stubs or special clipboard data exchanges. Also, a Copy-On-Write file system, such as provided in the Virtuozzo™ product available from SWsoft, of Herndon, Va., may be used.

Additionally, other services normally not present on a conventional end user computer, can be launched, in order to ensure functionality of the VPSs, as needed. Examples of such services are authentication and logins (over and above the conventional login for gaining access to the end user computer itself). For example, each VPS can have its own authorization mechanism, or several VPSs can be grouped to require a single authorization and/or login. As yet another option, once a user logs in to the end user computer, that login may be effective for all the VPSs that require authorization.

Each VPS can run its own dedicated file system, or its own dedicated portion of a file system. Alternatively, various VPSs can share the file system with each other, and/or can share it with the operating system itself.

It is also possible that each VPS can have its own set of users and network access possibilities (for example, its own IP addresses, its own network share, etc.). Alternatively, the VPSs can share these resources with each other and/or with the operating system itself. Although in many instances, on a home computer, this is unnecessary, in a business environment, even in the case of a single end user computer, it may be useful to define separate network possibilities, such as IP addresses, for each individual user. Other options include anonymous or guest logins, with more limited rights than a named, authorized user.

The present invention also enables secure remote access of the home computer. For example, a user who is at work may be interested in accessing his home computer. In this case, if the user is using a screen delivery software, such as Windows Terminal Services, Citrix, VNC, Remote Desktop Software, Norton PC Anywhere, etc., it is possible to put icons on an end user computer, which will start the applications and services using different VPSs, but will provide a graphical user interface window to the user on the same console on which the user first logged in. In other words, when applications on the end user computer are launched by the user who is logged in remotely, the same principles apply, relating to starting up of VPSs, isolation, inter-process communication, etc. This helps ensure that even in the case of remote access, security of the home computer is preserved.

This same concept also applies when an application is launched remotely, and the entire window that the user sees on his monitor (when logged in remotely) is taken up by the launched application. Similarly, if two or more such windows are opened, these windows can belong to different VPSs. Thus, remote application windows delivery can be performed by the VPS (depending on the configuration), providing direct access to a graphical console from the VPS in which the application will run, in the same manner as if performed on a stand-alone computer. Alternatively, the same effect can be achieved by providing network access using special internal addresses, or using public addresses, or by sharing the public addresses with other VPSs, and/or with the operating system, or by using exclusive addresses inside the VPS. Network access can be direct (as in this case), or can be provided by using redirector or network proxies or firewalls. As yet another alternative for VPSs running on a single "box," imitation of remote access can be provided by using alternative means of interaction, such as named pipes, shared memory, inter-process communication (IPC), Local Procedure Calls/Remote Procedure Calls, API, memory mapped files, signals, events, etc.

The user can also introduce rules based on which a particular VPS can be selected for a particular application, or a set of applications or processes, and define which resources of the computer that VPS has access to—such as permissions, security-related issues, network resources, etc. To accomplish this, various VPS control tools available to the user can include any of the following:

means for creation/termination of VPSs;

means for file system and registry backup, and control information for backup/restore on a VPS level;

placement of applications/processes rules for creation/support of corresponding VPSs;

means for granulation of isolation for VPS/applications/processes and resource control;

definition of permissible operations for inter-VPS (and/or inter-process) communications;

optional dedicated communications means, such as proxies/dedicated network protocol support/file system control;

optional delegation of full or partial administration operations to an external (remote) administrator;

optional means for remote access of main computer console or of one or more VPS; and means for installation of applications into different VPS and configuration of shared resources.

Optionally, a means for migration of one of the VPSs can be included. For example, if two computers are connected to a network (whether in the home or in a business environment), it may be desirable to be able to migrate the VPSs and corresponding data from one of the computers to a second one, whether temporarily or permanently.

Additionally, one or more of the VPSs can be dedicated for administrative operations, such as described in co-pending patent application Ser. No. 10/826,280, filed on Apr. 19, 2004, entitled DEDICATION OF ADMINISTRATIVE SERVERS TO MANAGEMENT OF SERVER FUNCTIONS IN A MULTI-SERVER ENVIRONMENT, which is incorporated by reference herein.

Inter-VPS communication means, such as proxies, can generally be divided into two classes: buffers and online redirectors. Buffers serve to temporarily store requests and data, and to later provide the information to appropriate recipients. Examples of such buffers include Windows clipboards, and XWindows clipboards. Online redirectors provide a simulation of direct communication between two recipients that run in different VPSs, in the same manner as is done in a conventional computer system that does not have VPSs. Examples of such online redirectors are so-called network redirectors and RPCs (remote procedure calls).

The process of data transfer for buffers can be different for different operating systems, and can also depend upon implementation policies. For example, in the case of clipboards, each VPS and each host system can have its own clipboard application. There can be, for instance, three types of policies:

1. Immediate distribution of data that is copied by one VPS into its clipboard, and then into clipboards of all other VPSs. In other words, the content of one clipboard is replicated to the host system and to all other VPSs. In this case, the data is copied into the clipboard of one VPS, and replicated to all clipboards, and then pasted from particular clipboard of particular VPS or the operating system.

2. Notification mode—this mode is used when the fact of the presence of new data in a local clipboard of a particular VPS is recorded. Then, the data is attempted to be pasted from the clipboard in some other VPS. At that point in time, the system checks whether the data being copied is the latest clipboard data, then copies the data into a local clipboard using some established communication mechanism. The data is then pasted into the local clipboard of the recipient VPS.

3. A policy can be designed that is between options (1) and (2) above. For example, it is possible to always copy all the data to a host clipboard when a local VPS clipboard copy operation is performed. It is also possible to copy the data from a host clipboard to a local clipboard in a different VPS before any paste operations are performed in that VPS.

Figure 9A:
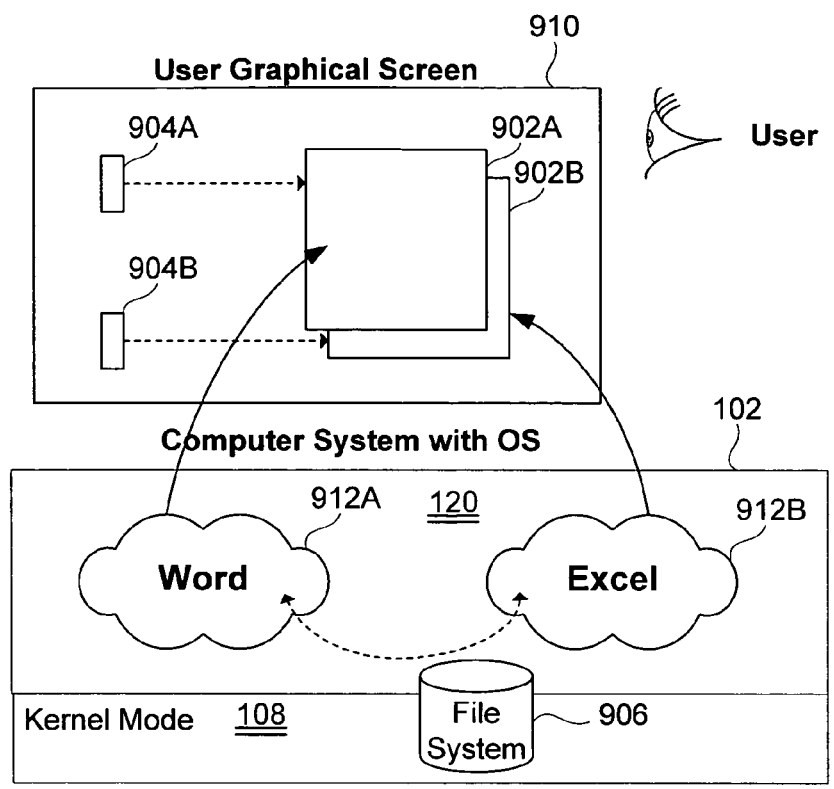
FIGS. 9A and 9B illustrate the use of a VPS to configure application launching and communication on an end user computer.
Figure 9B:
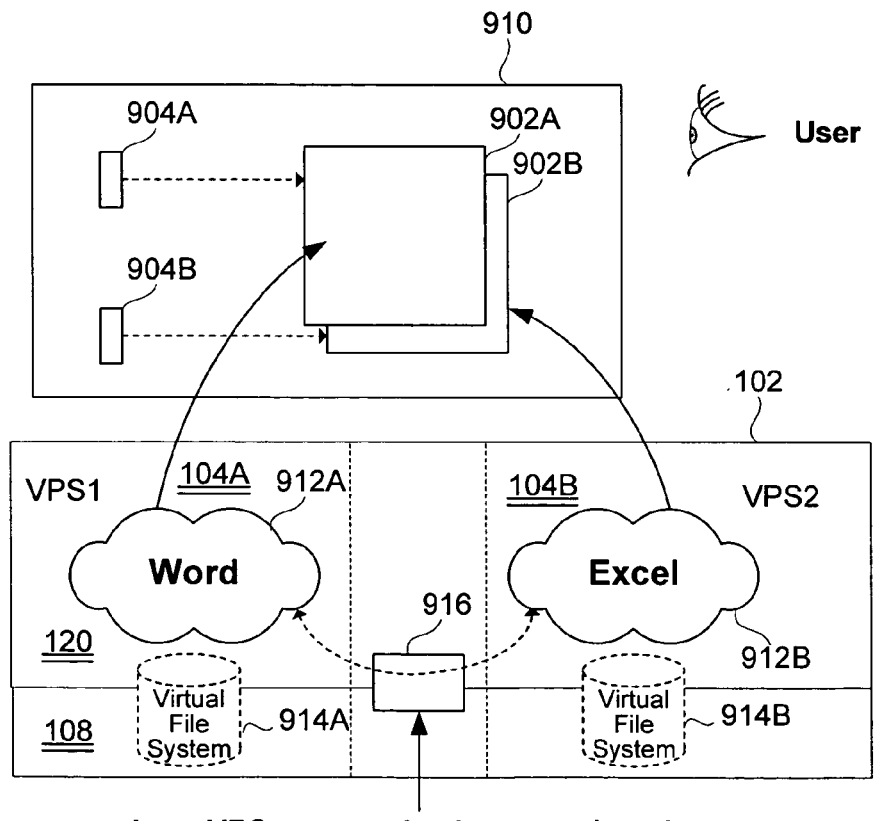

FIGS. 9A-9B illustrate how the VPS approach described above is used to configure application launching and communication. As shown in FIG. 9A, a user views a graphical screen 910, with two windows 902A, 902B open. The computer system 102 has a user mode 120, and a kernel mode 108. A file system 906 is shared by both modes. Two applications, Microsoft Word™ 912A and Microsoft Excel™ 912B, are running, with Microsoft Word™ 912A open in window 902A, and Microsoft Excel™ 912B open in window 902B. The applications are launched using icons 904A, 904B, respectively.

In FIG. 9B, instead of the "monolithic" approach, two VPSs are running, 104A and 104B. The application, Microsoft Word™ 912A, is launched within the VPS 104A. The application, Microsoft Excel™ 912B, is launched within the VPS 104B. These two applications communicate using an inter-VPS communication mechanism 916, such as proxies, etc. Note that each VPS 104A, 104B has its own corresponding virtual file system 914A, 914B, instead of a single, unified file system 906.

Figure 10:
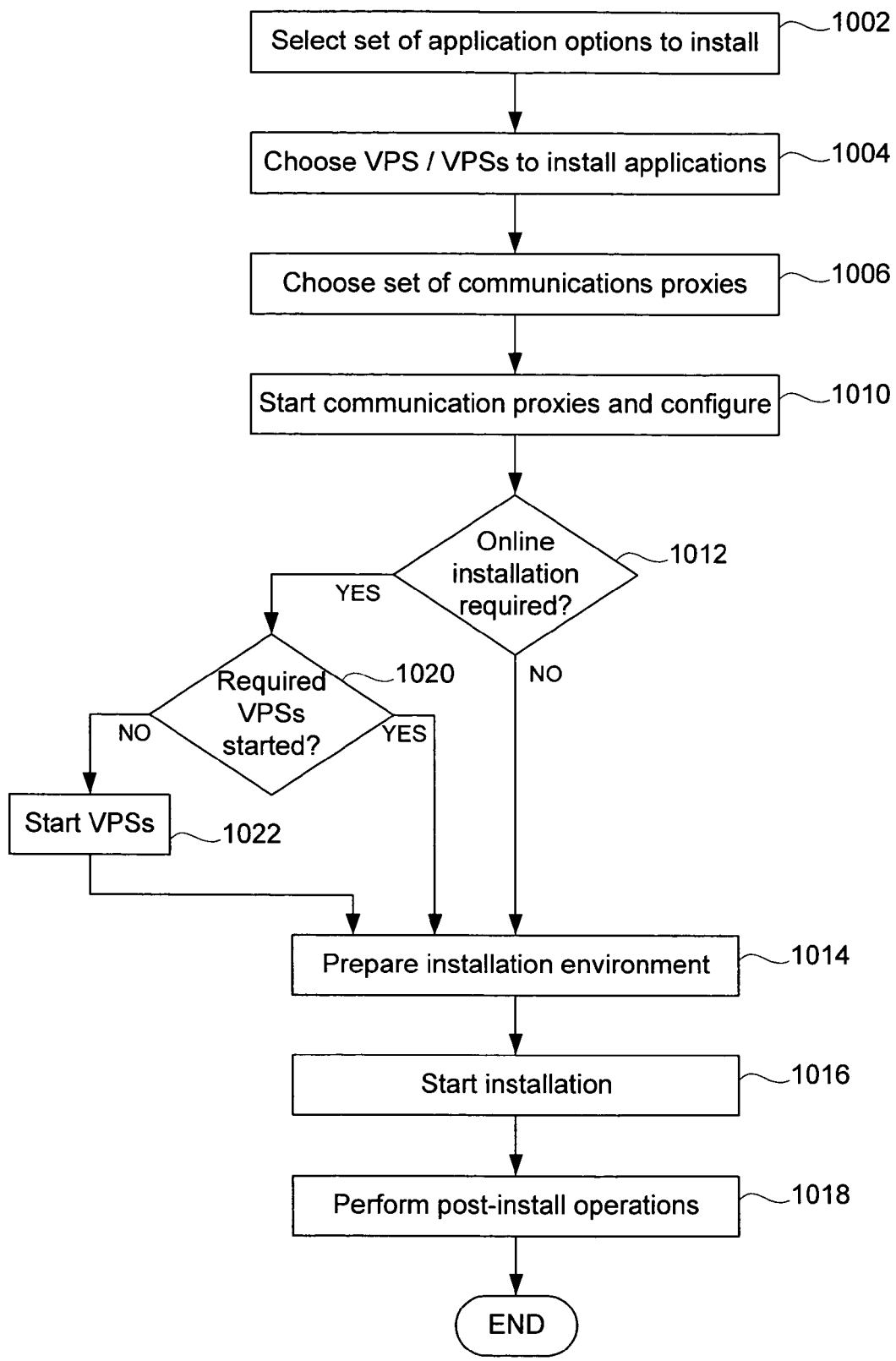
FIG. 10 illustrates the process of installing an application on the end user.

FIG. 10 illustrates the process of installing an application. In step 1002, a set of application options to be installed is selected. In step 1004, the VPS or VPSs in which these applications will be installed are chosen. In step 1006, the set of communications proxies is chosen. In step 1010, communication proxies are started and configured. If online installation is required (step 1012), then it is checked whether the required VPSs have been started (step 1020). If they have not been started, then the VPSs are started (step 1022), and the process advances to preparing the installation environment (step 1014). If the required VPSs have been started, then the process proceeds from step 1020 directly to step 1014. If no online installation is required in step 1012, the process also proceeds to step 1014. The installation is then initiated (step 1016). After installation is completed, any residual post-installation operations are performed (step 1018).

Figure 11:
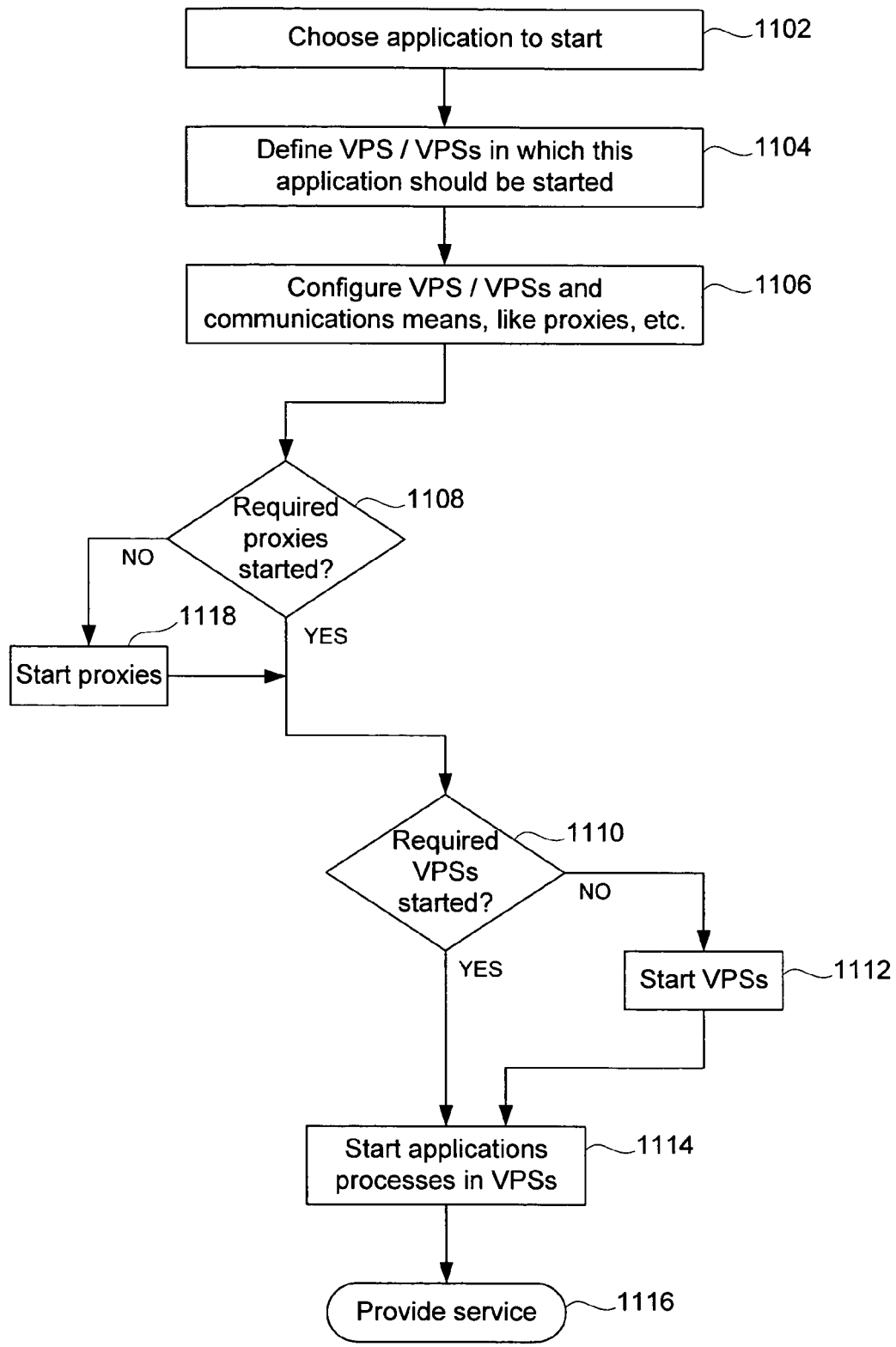
FIG. 11 illustrates the process of starting an application on the end user.

FIG. 11 illustrates the process of starting an application, such as, for example, from a command line menu, from a desktop icon, etc. In step 1102, the application that needs to be started is chosen. In step 1104, the VPS or multiple VPSs in which this application needs to be started are identified. In step 1106, the VPS or VPSs are configured. Also, communications means, such as proxies and firewalls, are configured. In step 1108, if the required proxies have not been started, then the process proceeds to step 1118, and starts the proxies. If the proxies have been started in step 1108, then the process proceeds to step 1110, which determines whether the required VPSs have been started. If they have not been started, then in step 1112, the required VPSs are started. If they have been started, then the process proceeds to step 1114, and the applications are launched in the VPSs. Once the applications are launched, then services are provided to the user (step 1116).

Figure 12A:
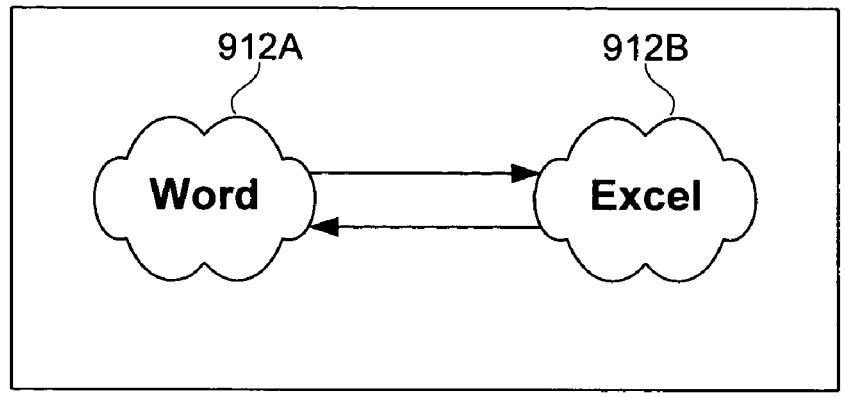
FIGS. 12A-12B illustrate an exemplary inter-process communication using an online redirector.
Figure 12B:
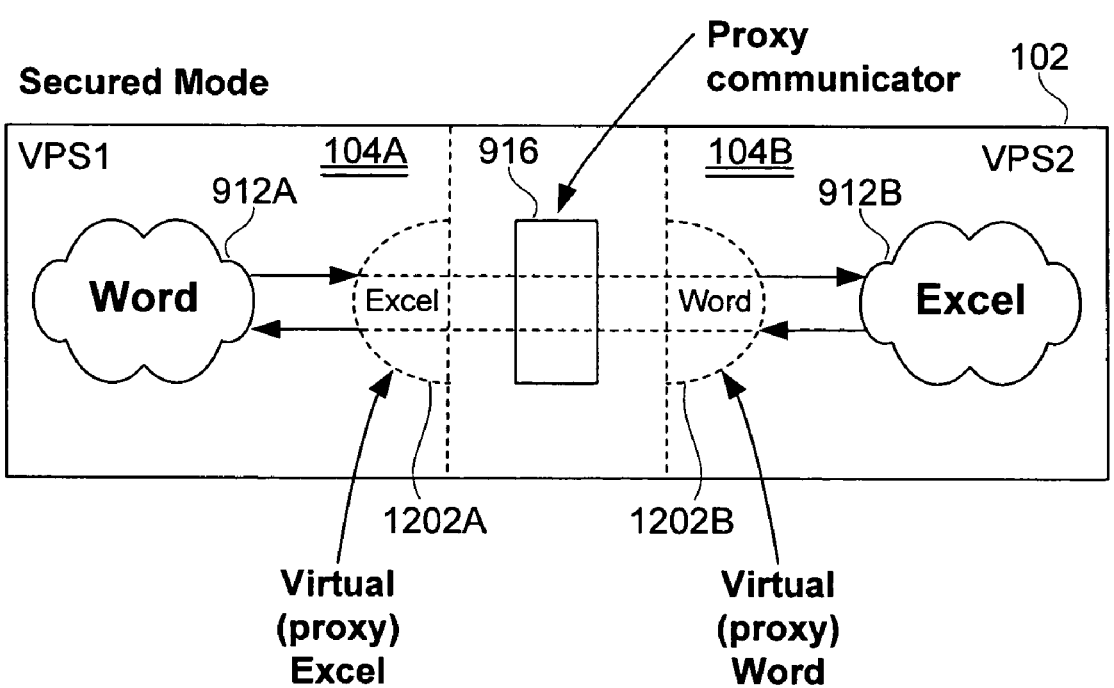

FIGS. 12A-12B illustrate the online redirector approach. As shown in FIG. 12A, conventionally, two applications, such as Microsoft Word™ 912A and Microsoft Excel™ 912B, communicate directly with each other using COM objects. The present approach provides a secure mode of communication.

As shown in the lower half of FIG. 12B, Word 912A is running in VPS 104A, and Excel 912B is running in VPS 104B. A proxy communicator 916 is used to permit the two applications 912A, 912B to communicate with each other. Virtual proxy applications are actually created in the individual VPSs 104A, 104B. A virtual Excel proxy 1202A is created in the VPS 104A, and a virtual Word proxy 1202B is created in the VPS 104B. Thus, rather than directly communicating with each other, the applications 912A, 912B communicate only with proxy applications, which in turn communicate with each other through a secure proxy communicator 916.

The present approach has a number of advantages. Overall security level of the end user computer is improved. Virus infections can be contained more easily, and "participation" in certain types of malicious behavior, such as denial of service attacks, can be prevented. The present approach also provides a way to separate and control different kinds of network traffic, and the processes and services related to it. There is also a way to separate date that is accessible remotely on a computer from trusted areas (like the corporate intranet) and from less-trusted areas, such as the Internet. Isolation of VPSs can be supported on a hardware level (for example, using Intel Corp.'s CPU partitioning concepts, or hyper-threading). Alternatively, VPS isolation can be supported on a software level, in accordance with one embodiment of the present invention.

This approach gives an ability to easily detect, automatically isolate and restore a state of a process on a VPS level, in the event of virus attacks or other application failure. It simplifies migration of a partial or a full set of VPSs to other hardware, and can be utilized in cases of any upgrades/back-ups/new application installation even in home computers. Users can migrate to a temporary VPS with, for example, a user-tuned Word installation with all additional work files between, for example, a remote server, a desktop computer and a laptop. A management console, snap-ins and other means that simplify administration of computer system are provided, along with a set of default rules that allows totally transparent default behavior of the computer similar (from the user point of view) to a conventional standalone computer. It can easily be integrated with third party security tools, such as like antivirus software, intrusion detection, firewalls, access control mechanisms, and so on. It can be used both in a home network and an enterprise environment.

The approach described above also can help in prevention of virus attacks or from damage from misbehavior of applications even when the viruses are unknown or the virus detection software is not yet aware of a new type of virus (for example, virus detection software usually requires some sort of a virus signature and only after that can take preventive measures). The proposed approach can protect the system from damage even without any initial information about the virus, but simply due to selected secure configuration.

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. An end user computer comprising:
    a processor running an operating system;
    a plurality of isolated virtual private servers (VPSs) supported by the operating system; and
    a plurality of applications available to a user of the end user computer,
    wherein at least two of the applications are launched within different VPSs,
    wherein the applications launched within different VPSs communicate with each other using secure communications means, and
    wherein at least one VPS is dedicated for administrative operations over the other VPSs.

2. The end user computer of claim 1, wherein at least one of the VPSs has multiple applications launched within it.

3. The end user computer of claim 1, wherein the secure communications means includes any of a firewall, a proxy, a dedicated clipboard, a named pipe, shared memory, dedicated inter-process communications, Local Procedure Calls/Remote Procedure Calls, network sockets, TCP/IP communications, network protocol communications, and memory mapped files.

4. The end user computer of claim 1, wherein the VPSs are dynamically created and terminated.

5. The end user computer of claim 1, further comprising VPS control means available to the user, the VPS control means including any of:
    means for creation/termination of VPSs;
    a file system and registry backup;
    control information for backup/restore of data on a VPS level;
    placement of applications/processes rules for creation/support of corresponding VPSs;
    granulation of isolation for VPS/applications/processes;
    computer resource control;
    definition of permissible operations for inter-VPS communication;
    definition of permissible operations for inter-process communications;
    means for delegation of full or partial administration operations to a remote administrator;
    means for remote access of the end user computer;
    means for remote access of the VPSs;
    means for installation of applications into different VPS and configuration of shared resources; and
    means for migration of the VPSs.

6. An end user computer comprising:
    a processor running an operating system; and
    a plurality of applications available to a user of the end user computer and running on the processor,
    wherein the applications are launched within corresponding isolated virtual private servers (VPSs) and communicate with each other using secure communications means, each VPS functioning as a stand-alone computer, and
    wherein at least one VPS is dedicated for administrative operations over the other VPSs.

7. The end user computer of claim 6, wherein at least one of the VPSs has multiple applications launched within it.

8. The end user computer of claim 6, wherein the secure communications means includes any of a firewall, a proxy, a dedicated clipboard, a named pipe, shared memory, dedicated inter-process communications, Local Procedure Calls/Remote Procedure Calls, network sockets, TCP/IP communications, network protocol communications, and memory mapped files.

9. The end user computer of claim 6, wherein the VPSs are dynamically created and terminated.

10. The end user computer of claim 6, further comprising control means for management of the VPSs, the control means including any of:
    means for creation/termination of the VPSs;
    a file system and registry backup;
    control information for backup/restore of data on a zone level;
    means for placement of applications/processes rules for creation/support of corresponding VPSs;
    means for granulation of isolation for zone/applications/processes;
    computer resource control;
    means for definition of permissible operations for inter-zone communication;
    means for definition of permissible operations for inter-process communications;
    means for delegation of full or partial administration operations to a remote administrator;
    means for remote access of the end user computer;
    means for remote access of the VPSs
    means for installation of applications into different VPSs;
    means for configuration of shared resources; and
    means for migration of the VPSs.

11. A method of operating an end user computer comprising:
    instantiating a plurality of isolated virtual private servers (VPSs) supported within an operating system running on the computer, each VPS functioning as a stand-alone computer, and all the VPSs sharing the same operating system; and
    launching a plurality of applications available to a user of the computer,
    wherein at least two of the applications are launched within different VPSs,
    wherein the applications launched within different VPSs communicate with each other using secure communications means, and
    wherein at least one VPS is dedicated for administrative operations over the other VPSs.

12. The method of claim 11, wherein at least one of the VPSs has multiple applications launched within it.

13. The method of claim 11, wherein the secure communications means includes any of a firewall, a proxy, a dedicated clipboard, a named pipe, shared memory, dedicated inter-process communications, Local Procedure Calls/Remote Procedure Calls, network sockets, TCP/IP communications, network protocol communications, and memory mapped files.

14. The method of claim 11, further comprising dynamically creating and terminating the VPSs.

15. The method of claim 11, further comprising providing VPS control means to the user, the VPS control means including any of:
    means for creation/termination of VPSs;
    a file system and registry backup;
    control information for backup/restore of data on a VPS level;
    means for placement of applications/processes rules for creation/support of corresponding VPSs;
    means for granulation of isolation for VPS/applications/processes;
    means for computer resource control;
    means for definition of permissible operations for inter-VPS communication;
    means for definition of permissible operations for inter-process communications;
    means for delegation of full or partial administration operations to a remote administrator;
    means for remote access of the end user computer;
    means for remote access of the VPSs;
    means for installation of applications into different VPS and configuration of shared resources; and
    means for migration of the VPSs.

16. A system for operating an end user computer comprising:
    means for instantiating a plurality of isolated virtual private servers (VPSs) supported within an operating system running on the computer; and
    means for launching a plurality of applications available to a user of the computer,
    wherein at least two of the applications are launched within different VPSs,
    wherein the applications launched within different VPSs communicate with each other using secure communications means, and
    wherein at least one VPS is dedicated for administrative operations over the other VPSs.

17. The system of claim 16, wherein at least one of the VPSs has multiple applications launched within it.

18. The system of claim 16, further comprising means for providing the applications launched within different VPSs secure communications means for communicating with each other.

19. The system of claim 18, wherein the secure communications means includes any of a firewall, a proxy, a dedicated clipboard, a named pipe, shared memory, dedicated inter-process communications, Local Procedure Calls/Remote Procedure Calls, network sockets, TCP/IP communications, network protocol communications, and memory mapped files.

20. The system of claim 16, further comprising means for dynamically creating and terminating the VPSs.

21. The system of claim 16, further comprising means for providing VPS control means to the user, the VPS control means including any of:
    means for creation/termination of VPSs;
    a file system and registry backup;
    control information for backup/restore of data on a VPS level;
    means for placement of applications/processes rules for creation/support of corresponding VPSs;
    means for granulation of isolation for VPS/applications/processes;
    means for computer resource control;
    means for definition of permissible operations for inter-VPS communication;
    means for definition of permissible operations for inter-process communications;
    means for delegation of full or partial administration operations to a remote administrator;
    means for remote access of the end user computer;
    means for remote access of the VPSs;
    means for installation of applications into different VPS and configuration of shared resources; and
    means for migration of the VPSs.

22. A computer useable storage medium having computer program logic stored thereon for executing on a processor, the computer program logic comprising:
    computer program code means for instantiating a plurality of virtual private servers (VPSs) supported within an operating system running on the computer; and
    computer program code means for launching a plurality of applications available to a user of the computer,
    wherein at least two of the applications are launched within different VPSs,
    wherein the applications launched within different VPSs communicate with each other using secure communications means, and
    wherein at least one VPS is dedicated for administrative operations over the other VPSs.

23. The system of claim 22, wherein at least one of the VPSs has multiple applications launched within it.

24. The system of claim 22, further comprising computer program code means for providing the applications launched within different VPSs secure communications computer program code means for communicating with each other.

25. The system of claim 24, wherein the secure communications means includes any of a firewall, a proxy, a dedicated clipboard, a named pipe, shared memory, dedicated inter-process communications, Local Procedure Calls/Remote Procedure Calls, network sockets, TCP/IP communications, network protocol communications, and memory mapped files.

26. The system of claim 22, further comprising computer program code means for dynamically creating and terminating the VPSs.

27. The system of claim 22, further comprising computer program code means for providing VPS control means to the user, the VPS control means including any of:
    computer program code means for creation/termination of VPSs;
    a file system and registry backup;
    control information for backup/restore of data on a VPS level;
    computer program code means for placement of applications/processes rules for creation/support of corresponding VPSs;
    computer program code means for granulation of isolation for VPS/applications/processes;
    computer program code means for computer resource control;
    computer program code means for definition of permissible operations for inter-VPS communication;
    computer program code means for definition of permissible operations for inter-process communications;
    computer program code means for delegation of full or partial administration operations to a remote administrator;
    computer program code means for remote access of the end user computer;
    computer program code means for remote access of the VPSs;

computer program code means for installation of applications into different VPS and configuration of shared resources; and computer program code means for migration of the VPSs.

28. A system for providing application hosting services comprising:

a computer running an operating system and a session of Windows Terminal Services as an isolated execution environment;

a user application running in the isolated execution environment and running as a process within that isolated execution environment to deliver, using Citrix screen delivery software, application hosting services to a remote user of that user application, wherein the user application is launched inside the session of Windows Terminal Services by activating an icon on a remote client computer, and wherein a graphical representation of data of the user application is maintained in a window on a desktop of the remote user by the Citrix screen delivery software.

29. A system for providing application hosting services comprising:

a computer running an operating system and a session of Windows Server as an isolated execution environment; and a user application running in the isolated execution environment and running as a process within that isolated execution environment to deliver, using Citrix screen delivery software, application hosting services to a remote user of that user application, wherein the user application is launched inside the session of Windows Server by activating an icon on a remote client computer, and wherein a graphical representation of data of the user application is maintained in a window on a desktop of the remote user by the Citrix screen delivery software.

* * * * *